(12) United States Patent
Kempinski et al.

(10) Patent No.: US 9,952,663 B2
(45) Date of Patent: Apr. 24, 2018

(54) METHOD FOR GESTURE-BASED OPERATION CONTROL

(71) Applicant: Umoove Services Ltd., Jerusalem (IL)

(72) Inventors: Yitzchak Kempinski, Geva Binyamin (IL); Yair Barak, Elazar (IL); Tuvia Elbaum, Jerusalem (IL)

(73) Assignee: Umoove Services Ltd., Jerusalem (IL)

( * ) Notice: Subject to any disclaimer, the term of this patent is extended or adjusted under 35 U.S.C. 154(b) by 633 days.

(21) Appl. No.: 14/400,003

(22) PCT Filed: May 9, 2013

(86) PCT No.: PCT/IL2013/050409
§ 371 (c)(1),
(2) Date: Nov. 10, 2014

(87) PCT Pub. No.: WO2013/168171
PCT Pub. Date: Nov. 14, 2013

(65) Prior Publication Data
US 2015/0149956 A1    May 28, 2015

Related U.S. Application Data

(60) Provisional application No. 61/645,422, filed on May 10, 2012, provisional application No. 61/645,436,
(Continued)

(30) Foreign Application Priority Data
Jan. 27, 2013 (WO) .................. PCT/IL2013/050072

(51) Int. Cl.
*G06F 3/01* (2006.01)
*G06F 3/038* (2013.01)
*G06F 3/0485* (2013.01)

(52) U.S. Cl.
CPC .............. *G06F 3/012* (2013.01); *G06F 3/017* (2013.01); *G06F 3/038* (2013.01); *G06F 3/0485* (2013.01); *G06F 2203/0381* (2013.01)

(58) Field of Classification Search
CPC ........ G06F 3/0485; G06F 3/012; G06F 3/038; G06F 3/017
See application file for complete search history.

(56) References Cited

U.S. PATENT DOCUMENTS 5,675,376 A * 10/1997 Andersson ............. H04N 7/142
348/14.08
6,421,064 B1 * 7/2002 Lemelson ............... G06F 3/013
345/688
(Continued)

FOREIGN PATENT DOCUMENTS

WO   WO 2011/066343   6/2011
WO   WO 2012/038589   3/2012
WO   WO 2013/111140   8/2013

OTHER PUBLICATIONS

United States Office Action issued in U.S. Appl. No. 14/373,906, dated Sep. 24, 2015.
(Continued)

*Primary Examiner* — Abbas Abdulselam
(74) *Attorney, Agent, or Firm* — Pearl Cohen Zedek Latzer Baratz LLP

(57) ABSTRACT

A method may track a motion of a body part in a series of images captured by an imager that is associated with an electronic device, and detect in such motion a gesture of the body part that matches a pre-defined gesture. Upon such detection of the gesture, a function that is associated with the gesture is activated but only upon a contact or other input, such as a push of a button by a user. The combination of the 'push to enable' and the 'gesture to activate the function' may provide comfortable operation of the gesture activation of a function. A system and method of altering a zoom of an image displayed on an electronic device by detecting in a series of images a change in distance between the device and a viewer of the image, and zooming the image to correspond
(Continued)

to such change in position. The captured images and detected change in distance may be interpreted by a processor as a zoom gesture that may trigger a zoom of the displayed image. A system and method of activating a scroll function for content that is displayed on an electronic screen, including capturing a series of images of a body part, such as a head, of a viewer of the content, and detecting a rotation, a change in orientation, or a change in a position of such head. A method may interpret the detected change as a gesture, and activate a scroll function to scroll the displayed content in a direction opposite the direction of the gesture or with other parameters defined by the detected gesture.

20 Claims, 13 Drawing Sheets

Related U.S. Application Data filed on May 10, 2012, provisional application No. 61/645,693, filed on May 11, 2012, provisional application No. 61/760,749, filed on Feb. 5, 2013.

(56) References Cited

U.S. PATENT DOCUMENTS

| | | |
|---|---|---|
| 7,130,453 B2 | 10/2006 | Kondo |
| 8,527,908 B2 | 9/2013 | Pance et al. |
| 9,152,318 B2 * | 10/2015 | Krishnaraj .............. G06F 3/016 |
| 9,202,280 B2 | 12/2015 | Wu |
| 2003/0169213 A1 | 9/2003 | Spero |
| 2004/0005083 A1 | 1/2004 | Fujimura |
| 2004/0161134 A1 | 8/2004 | Kawato et al. |
| 2004/0240709 A1 | 12/2004 | Shoemaker |
| 2005/0243054 A1 | 11/2005 | Beymer et al. |
| 2006/0110008 A1 | 5/2006 | Vertegaal et al. |
| 2010/0183205 A1 | 7/2010 | Pfleger |
| 2010/0303294 A1 | 12/2010 | Zschau |
| 2011/0006978 A1 | 1/2011 | Yuan |
| 2011/0181510 A1 * | 7/2011 | Hakala .................... G06F 3/017 345/158 |
| 2011/0317872 A1 | 12/2011 | Free |
| 2012/0064951 A1 * | 3/2012 | Agevik .................. G06F 3/012 455/569.1 |
| 2013/0246331 A1 | 9/2013 | Helfman et al. |

OTHER PUBLICATIONS

United States Office Action issued in U.S. Appl. No. 14/373,906, dated May 26, 2016.

International Search Report of PCT Application No. PCT/IL2013/050072, dated Jul. 25, 2013.

Notice of Allowace of U.S. Appl. No. 14/373,906, dated Jan. 9, 2017.

* cited by examiner

METHOD FOR GESTURE-BASED OPERATION CONTROL

CROSS-REFERENCE TO RELATED APPLICATIONS

This application is a National Phase Application of PCT International Application No. PCT/IL2013/050409, International Filing Date May 9, 2013, claiming priority of US Patent Applications Nos. 61/645,436, filed May 10, 2012, 61/645,422, filed May 10, 2012, 61/645,693, filed May 11, 2012, 61/760,749 filed Feb. 5, 2013 and PCT Application No. PCT/IL2013/050072 filed Jan. 27, 2013, all of which are hereby incorporated by reference.

FIELD OF THE INVENTION

The present invention relates to gesture-based operation of a device. More particularly, the present invention relates to control of gesture-based operation of the device.

BACKGROUND OF THE INVENTION

Head and eye gestures may be monitored by a camera or other sensor for operation of electronic devices and implementation of functions on such devices.

SUMMARY OF THE INVENTION

Embodiments of the invention may include a method for controlling a function of an electronic device by tracking a position of a body part in a series of acquired images, detecting a motion of the tracked body part in the images, where the motion is associated with a pre-defined gesture of the body part; and concurrently or following a contact by a user of the device with a control of the device, activating the function of the device that is associated with the detected gesture.

In some embodiments, tracking a position of a body part includes applying a first tracking algorithm upon the contact by the user, and applying a second tracking algorithm in the absence of such contact. In some embodiments the control of the device may include one or more of a button, a touch screen, and a foot pedal. In some embodiments, the contact of the device may toggle the enabling of the implementation of the gesture-based control of the function until the toggle is released so that the gesture detection and implementation function remains activated after contact of the user with the toggle until a deactivating event occurs. In some embodiments, the deactivating event includes de-toggling or an absence of a user action when the user action is expected. For example, a query or instruction may be presented to the user asking whether he still wants the detection function to be enabled, or some other interaction may be requested or expected by the user, within for example a predetermined time period, or an elapse of a period may occur wherein no relevant input is received from the user.

In some embodiments, the contact of the user with an input device may also serve a second, separate or additional function that is not associated with the gesture based function activation. In some embodiments, the contact of the user with the input device may trigger a calibration or initiation of the gesture detection or the imaging process.

In some embodiments, tracking a position of a body part includes tracking the body part in the acquired images, estimating an expected size and expected location of an image of an iris within that acquired images, and determining a location of an iris within that acquired image by identifying a region within the expected location, a size of the region being consistent with the expected size.

In some embodiments, the body part detected may include one or more of a head, a face, a finger, a hand, and an eye.

Embodiments of the invention may include a system having an imaging device to acquire a series of images of a body part; a control to operate a function of an electronic device; and a processor to track a motion of the imaged body part in the acquired images, identify the tracked motion as associated with a gesture, and when the control is contacted or toggled, to operate the electronic function that as associated with the identified gesture. In some embodiments, the implementation of a tracking of a gesture may be enabled when the input device is contacted, and the gesture-controlled function may be executed when the gesture is detected. The release, disenabling or deactivating event may include an absence of a user action when the user action is expected.

In some embodiments, input devices may include one or more of a pushbutton, foot pedal, toggle switch, slide, wheel, dial, knob, joystick, trackball, mouse, touch screen, key, microphone, pressure sensor, thermal sensor, and optical sensor.

Embodiments of the invention may include a method of controlling a mobile device by detecting a change in a distance between a user of the mobile device and the mobile device, and adjusting a zoom of an image that is displayed on a display screen of the mobile device as indicated by the detected change. In some embodiments, detecting the change in the distance includes determining a direction of the detected change, and adjusting the zoom includes adjusting the zoom as indicated by the determined direction. In some embodiments, adjusting the zoom includes zooming in when the determined direction is inward, and zooming out when the determined direction is outward. In some embodiments, adjusting the zoom includes zooming out when the determined direction is inward, and zooming in when the determined direction is outward. In some embodiments, detecting the change in the distance includes determining a magnitude of the detected change, and adjusting the zoom includes adjusting the zoom as indicated by the determined magnitude. In some embodiments, adjusting the zoom includes changing a zoom level as indicated by the determined magnitude.

In some embodiments, detecting the change in the distance includes determining a speed of the detected change, and adjusting the zoom includes adjusting the zoom as indicated by the determined speed. In some embodiments, adjusting the zoom includes changing a zoom level at a rate that is indicated by the determined speed. In some embodiments, detecting the change in the distance includes detecting two or more changes in the distance, and adjusting the zoom includes adjusting the zoom as indicated by a zoom gesture corresponding to two or more changes.

Some embodiments include receiving a signal from an input associated with the device, where the signal is to activate the adjusting of the image upon such detecting.

In some embodiments, adjusting the zoom includes verifying that a magnitude or speed of the detected change falls within a predetermined range.

In some embodiments, adjusting the zoom includes adjusting the zoom of a selected element or area of the image. Some embodiments include displaying on the screen a visual indication of the selected element.

In some embodiments, tracking the body part includes acquiring frames by an imaging device of the mobile device that include an image of a body part such as one or more of an eye, a face, a facial feature, and a head.

In some embodiments, an extent of the adjusting is a function of an extent of the detected change.

In some embodiments, the adjusting includes displaying previously omitted features of the displayed image when zooming in, or omitting previously displayed features when zooming out.

Embodiments of the invention include an electronic device having an imaging device to acquire a series of images of a body part, a display screen to display an image, a processor to implement a zoom of at least one element of the image being adjustable, to track a motion of the imaged body part in the series of acquired images, to detect a change in a distance of the body part from the imaging device; and to adjust the zoom of at least one element of the image as indicated by the detected change. In some embodiments, the processor may estimate an expected size and expected location of an image of an iris within the acquired image, and determine a location of the iris.

There is thus provided, in accordance with some embodiments of the present invention, a method for scrolling displayed content, the method including: detecting, in a series of acquired images of a user of a device on which the content is displayed, a movement of a head of the user; and, when the detected movement corresponds to a gesture, scrolling the displayed content as indicated by the gesture.

Furthermore, in accordance with some embodiments of the present invention, a direction of the scrolling is opposite a direction of the detected head movement.

Furthermore, in accordance with some embodiments of the present invention, a rate of the scrolling is determined by a magnitude of a vector that characterizes the detected head movement.

Furthermore, in accordance with some embodiments of the present invention, the scrolling continues until detection of another head movement.

Furthermore, in accordance with some embodiments of the present invention, an extent of the scrolling is determined by an extent of a change of an orientation of the head in the detected head movement.

Furthermore, in accordance with some embodiments of the present invention, an extent of the scrolling is proportional to said change in orientation.

Furthermore, in accordance with some embodiments of the present invention, the extent of a change in orientation is determined as a fraction of a head movement range.

Furthermore, in accordance with some embodiments of the present invention, the scrolling comprises moving a screen object to a position that is determined by the change in the orientation.

Furthermore, in accordance with some embodiments of the present invention, the detected motion corresponds to the gesture when the detected movement exceeds an ignore range.

Furthermore, in accordance with some embodiments of the present invention, detecting the head includes, in an acquired image of the series of acquired images, estimating an expected size and expected location of an image of an iris of an eye within that acquired image, and determining a location of the iris image within that acquired image by identifying a region within the expected location, a size of the region being consistent with the expected size, wherein pixels of the region have luminance values darker than pixels of other regions within the expected location.

There is further provided, in accordance with some embodiments of the present invention, a device including: a display screen configurable to display a content; an imaging device configurable to acquire a series of images of a head of a user of the device; a processor configured to: detect in the series of acquired images, a movement of the user's head; and scroll the displayed content in a manner indicated by the detected movement.

Furthermore, in accordance with some embodiments of the present invention, the device includes a mobile device.

Furthermore, in accordance with some embodiments of the present invention, the imaging device includes a video camera.

Furthermore, in accordance with some embodiments of the present invention, the processor is configured to scroll the displayed content at a rate of that is indicated by the detected movement.

Furthermore, in accordance with some embodiments of the present invention, the processor is configured to scroll the displayed content in a direction that is opposite to the detected movement.

Furthermore, in accordance with some embodiments of the present invention, the processor is configured to scroll the displayed content when the detected movement is greater than an ignore range.

Furthermore, in accordance with some embodiments of the present invention, the processor is configured to continue to scroll the displayed content until another head movement is detected.

There is further provided, in accordance with some embodiments of the present invention, a method of activating a scroll function on an electronic display, the method including: detecting, in a series of images captured by an imager, the imager associated with the display, a movement of a body part of a viewer to a pre-defined orientation, the movement associated with activation of said scroll function; and activating the scroll function for the duration of a period that said body part retains said orientation.

Furthermore, in accordance with some embodiments of the present invention, the detecting the movement of a body part includes detecting a direction of a movement of a head of the user, and wherein the activating of the scroll function includes, scrolling content displayed on the display in a direction opposite of the detected movement.

Furthermore, in accordance with some embodiments of the present invention, the detecting of the pre-defined movement includes detecting a movement of a head past an ignore range, and wherein an intensity of the scrolling is a function of an intensity of the movement.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

10A schematically illustrates a head position for gesture-based scrolling of displayed content, in accordance with an embodiment of the present invention.

Figure 10A:
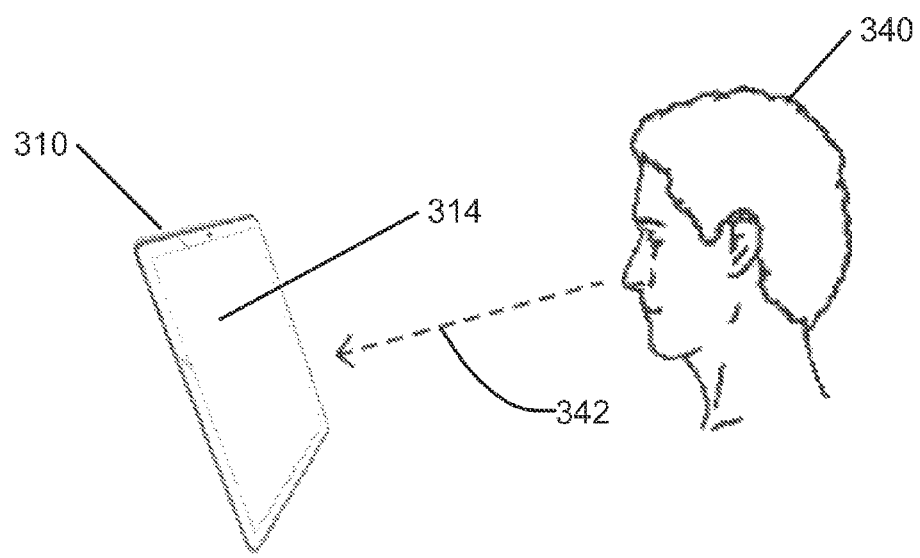
Figure 10B:
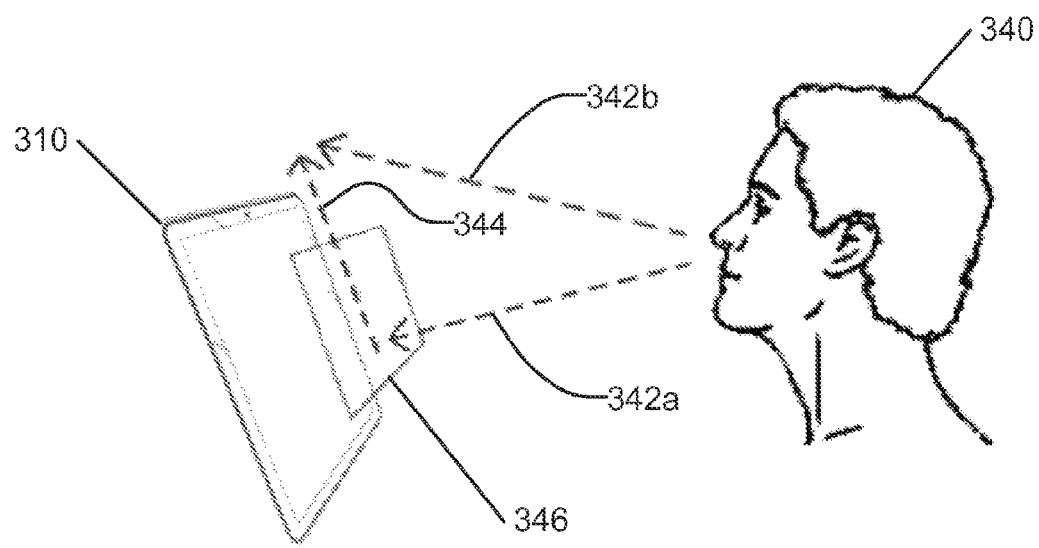

FIG. 10B schematically illustrates a change in head position for gesture-based scrolling of displayed content, in accordance with an embodiment of the present invention.

Figure 11A:
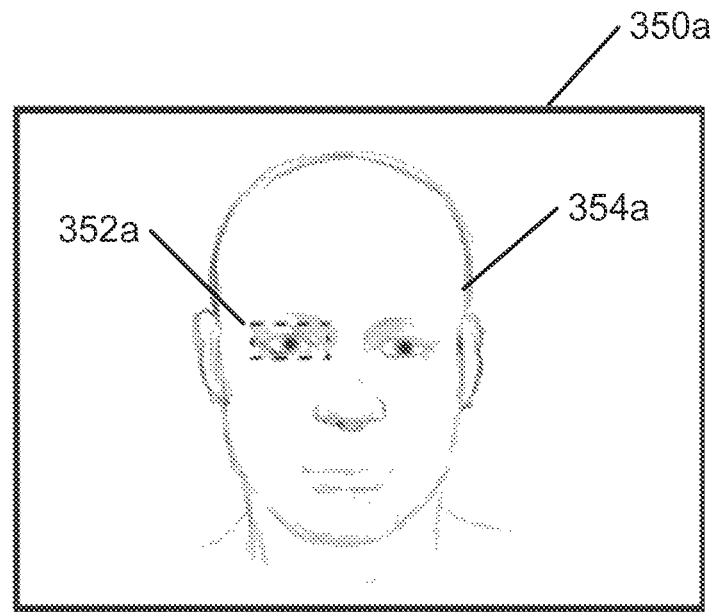

FIG. 11A schematically illustrates a position of an element in a head image for gesture-based scrolling of displayed content, in accordance with an embodiment of the present invention.

Figure 11B:
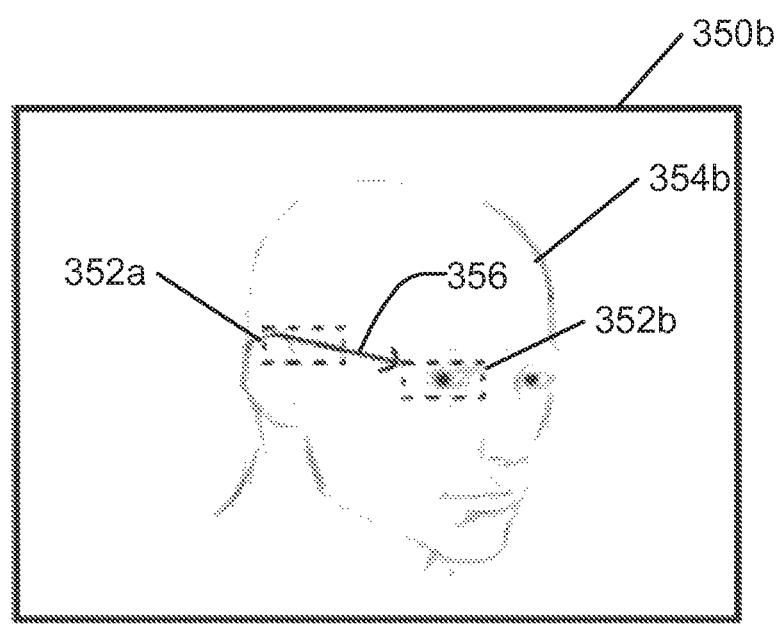

FIG. 11B schematically illustrates movement of an element of head image for gesture-based scrolling of displayed content, in accordance with an embodiment of the present invention.

Figure 12:
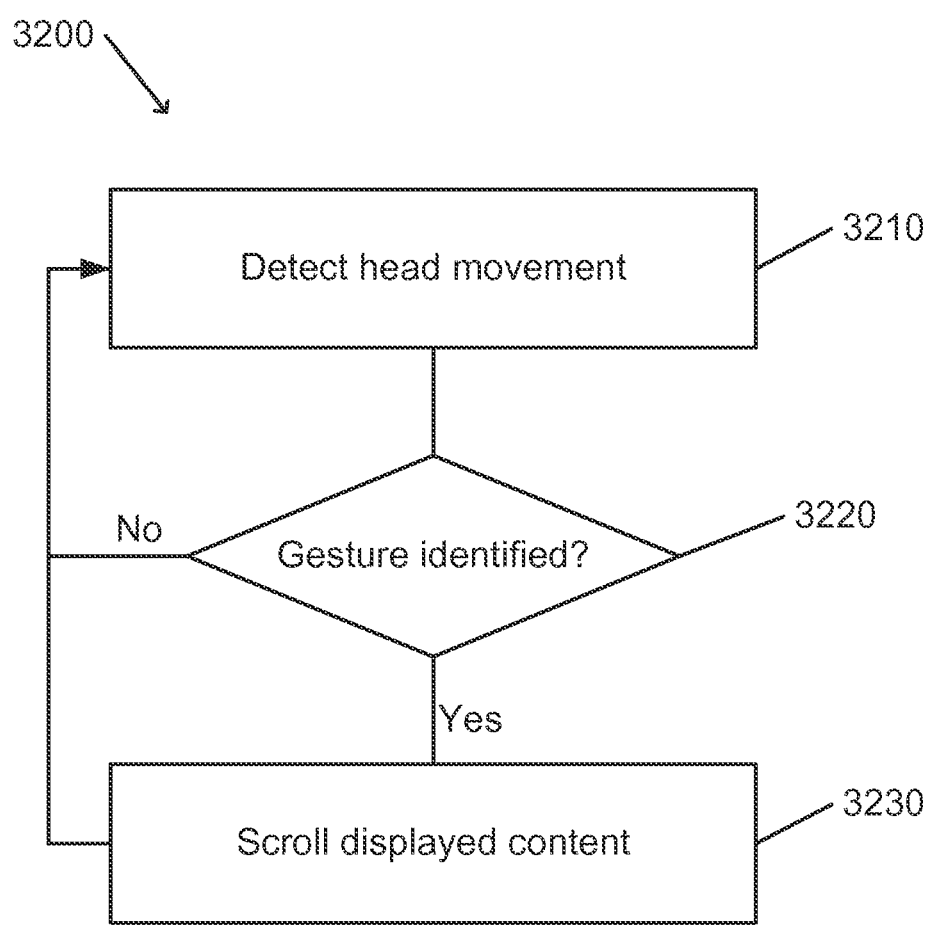

FIG. 12 is a flowchart depicting a method for gesture-based scrolling of displayed content, in accordance with an embodiment of the present invention.

Figure 13:
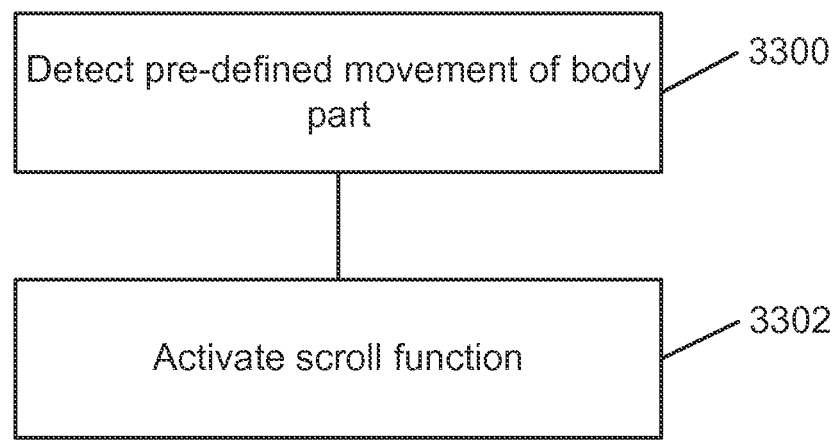

FIG. 13 is a flowchart of a method for activating a function for scrolling content on an electronic display, in accordance with an embodiment of the invention.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In accordance with embodiments of the present invention, movement of a head, face, eye, or other body part of a user of a device may be tracked so as to control operation of the device, or of another device. Tracked movements of the head, face, or eyes (hereinafter referred to as head tracking) may correspond to, and thus be interpreted as, gestures that indicate the user's intentions in controlling operation of the device. Such interpretation may be implemented by execution of an gesture interpretation (to be understood as including interpretation of gestures made with the head, face, or eyes, or by another body part such as the neck or shoulders whose movement may affect movement of the head) application by a processor of the device, or associated with the device.

However, during the course of a session during which the user is interacting with the device, the user's head may be moved in a manner that was not intended by the user to indicate a gesture. For example, the user may be distracted by, and face or look at, objects or events in the vicinity of the device. In order to enable a gesture interpretation application to distinguish between intentional gestures and unrelated movement, a gesture interpretation application may be activable or de-activable by one or more user actions. Thus, extraneous movement (e.g., movement of a body part that is not intended to indicate a gesture) does not affect operation of the device, and thus such movement may not interfere with desired operation of the device.

For example, activation or deactivation of a gesture interpretation application may be selected by operation of a "hold to track" function. In order that a tracked movement of the user's eyes be interpreted as a gesture, a user may be required perform a continuous, periodic, or toggled user action prior to, concurrently with, or following performance of the gesture. For example, a user action may include interaction with a displayed interface (e.g., by manual operation of a pointing device) or with an input device (e.g., by manual operation of a button or switch).

In accordance with some embodiments of the present invention, deactivation of the gesture interpretation application may interrupt automatic tracking of head movements. In accordance with other embodiments of the present invention, deactivation of the gesture interpretation application may interrupt interpretation of tracked head movements as gestures (while tracking continues), or may interrupt control of the device (while tracking and gesture interpretation continue). Any such procedure that results in gesture-based control of a device (e.g., a collection of functions that may include: tracking, gesture interpretation, control based on an interpreted gesture, or any other activity that determines whether the device is controlled by user head movements or movement of other body parts) is herein referred to as gesture operation of the device. Activation of deactivation of such gesture-based operation (e.g., all or a subset of the functions that are components of gesture-based operation) is herein referred to as gesture-based operation control.

Figure 1:
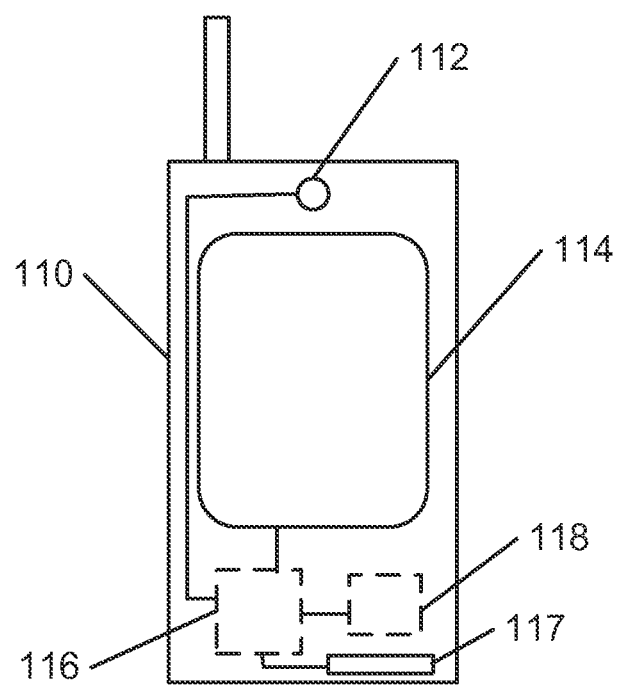
FIG. 1 is a schematic diagram of a device that may be configured for gesture-based operation control, in accordance with an embodiment of the present invention.

FIG. 1 is a schematic diagram of a device that may be configured for gesture-controlled operation, in accordance with an embodiment of the present invention.

Device 110 may include a portable computing device, such as a handheld computer or smart phone. Device 110 includes a video camera 112.

Device 110 may include a motion sensor 117. Motion sensor 117 may include one or more sensors for measuring a change in velocity, rotation, or orientation of device 110. For example, motion sensor 117 may include an accelerometer, a gyroscope, compass, level, or other component capable of detecting a change in velocity or orientation of device 110.

Device 110 includes processor 116. Processor 116 may receive a video signal, or other video or image data from video camera 112. Processor 116 may operate in accordance with programmed instructions.

Programmed instructions for operation of processor 116 may be stored on data storage unit 18. Programmed instructions may include instructions for gesture-controlled operation in accordance with an embodiment of the present invention. Data storage unit 118 may include one or more fixed or removable, non-volatile or volatile, data storage units or computer-readable media that is capable of storing data for use by processor 116. Data storage unit 118 may be used to store, e.g., in the form of frames, video or image data that is acquired using video camera 112. Data storage unit 118 may be used to store data for use by processor 16 in displaying an image on display screen 114. Data storage unit 118 may be used to store one or more parameters for operation of processor 116, or one or more results of a calculation performed during operation of processor 118.

Processor 116 may control display of an image, e.g., of textual or graphical content, on display screen 114. For example, processor 116 may control scrolling, panning, or zooming of the displayed content. Processor 116 may be configured to modify displayed content on display screen 114 in accordance with a result of gesture-controlled operation.

A device (e.g., device 110) configured for gesture-based operation control, in accordance with an embodiment of the invention, may include, for example, one or more processors (e.g., processor 116), memory or data storage devices (e.g., data storage unit 118), or imaging or image capture devices or sensors (e.g., video camera 112). Such a device may represent an independent unit or standalone device, or may be incorporated into, or associated with, another device or system. Such other devices or systems may include, for example, one or more components of a computer, a mobile device, a joystick, a vehicle dashboard or onboard computer, an equipment control key, or similar device.

In accordance with an embodiment of the present invention, a device is configured for gesture-based operation control. The device includes a user-operable control that may be operated in order to indicate whether operation of the device is to be controlled by gesture interpretation.

Figure 2:
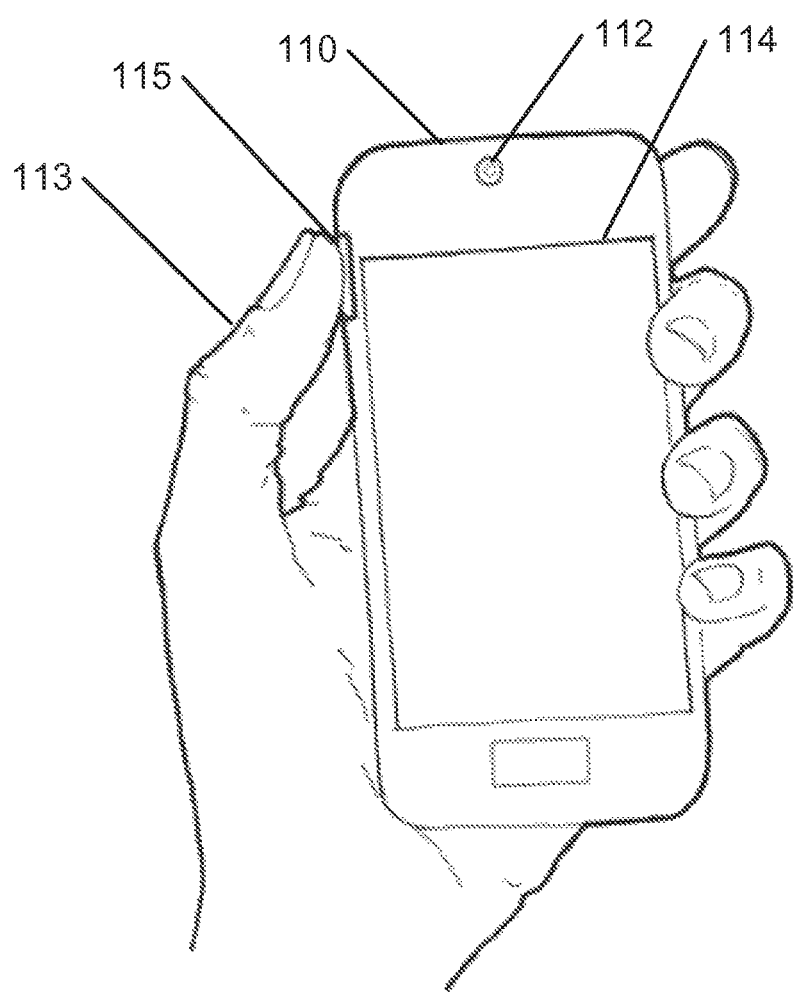
FIG. 2 schematically indicates a device configured for gesture-based operation control, in accordance with an embodiment of the present invention.

FIG. 2 schematically indicates a device configured for gesture-based operation control, in accordance with an embodiment of the present invention.

Device 110, including video camera 112 (which may represent another camera or imaging device that is configurable to acquire a sequence of images or frames) and display screen 114, is configured to enable gesture-based operation and interpretation and to enable gesture-based operation control. For example, a processor of device 110 may be configured to control displayed content on display screen 114 in accordance with monitored gesture based on images acquired by video camera 112.

The images acquired by video camera 112 may be analyzed to perform head or face tracking. A face may be detected in an acquired image of frame by application of a face detection algorithm or object detection algorithm. For example, application of a real time face detection algorithm may include utilizing the Viola-Jones object detection algorithm (using Haar features), or various other face detection and tracking algorithms included in the Open Source Computer Vision Library (OpenCV) or elsewhere. Application of such a face detection or object detection algorithm may detect boundaries of a face in a frame (e.g., features of a face such as an eye strip, an eye region, a nose, or glasses). Application of the face or object detection algorithm may indicate boundaries (e.g., based on a known relationship among facial elements) of one or more regions of the face, such as an eye region.

Head tracking may include eye tracking. For example, a method of eye tracking is described in PCT application No. PCT/IL2013/050072, and is incorporated in its entirety herein by reference. Other eye tracking techniques may be applied.

Device 10 includes user operable control 115. User operable control 115 represents one or more controls that may be operated by a user. User operable control 115 may be operated by a user, e.g., by touching, contacting, or applying force to user operable control by finger 113 (which may be understood as representing any finger, coordinated user of several fingers, a foot, any other limb or body part of the user, or a voiced or other audible command, that may be applied to operate user operable control 115). For example, user operable control 115 may represent a pushbutton, foot pedal, toggle switch, slide, wheel, dial, knob, joystick, trackball, mouse, touch screen, key, microphone, pressure sensor, thermal sensor, optical sensor, or other user operable component of device 110, or of another device that is configured for communication with device 110. User operable control 115 may be operated to activate or deactivate head tracking, gesture monitoring or interpretation, or gesture-based operation of device 110.

In accordance with embodiments of the present invention, when movement of the user is to be tracked and to be interpreted as gestures to control device 110, user operable control 115 is operated.

For example, user operable control 115 may be contacted or held by finger 113 (or otherwise continually operated) during an entire period during which gesture-controlled operation is activated. When user operable control 115 is released (e.g., contact with finger 113 is broken), then operation is no longer based on gesture.

As another example, user operable control 115 may be operated to toggle device 110 between a state in which gesture-based operation is activated, and a state during which gesture-based operation is deactivated. For example, momentary operation of user operable control 115 (e.g., pressing and releasing a pushbutton) may cause device 110 to change from its current state to an alternative state. (More than two states may be provided. For example, different sets of interpretable gestures may be activated in different states. As another example, different degrees of sensitivity to gestures may be enabled in different states.) A current state of device 110 may be indicated, e.g., by appearance of an appropriate notification, symbol, or icon on display screen 114 (or otherwise indicated, e.g., by a tone or other audible signal, or by a characteristic vibration or other palpable indication).

In accordance with some embodiments of the present invention, activation of gesture-based operation may include initialization of a tracking process (for example, initial face detection) or may initiate a calibration or recalibration process. A calibration process may require that the user's head or eyes be placed in a particular position or orientation with respect to device 110. For example, the user may be requested to face or look at a particular location, e.g., a point or displayed object on display screen 114, or something may appear on a screen which may attract a view of the user. Such a calibration may establish a reference point for use in subsequent interpretation of detected gestures.

In accordance with some embodiments of the present invention, continued gesture-based operation after initial activation of gesture-based operation may require periodic operation of user operable control 115. For example, when device 110 is in a state in which gesture-based operation is activated, the user may be prompted to operate user operable control 115 to confirm or indicate continued gesture-based operation. Failure to operate user operable control 115 in an appropriate manner within a predefined period of time may cause device 110 to change to a state in which gesture-based operation is deactivated. The prompt may be issued at a predetermined time after operation of user operable control 115 for initial activation of gesture-based operation, or after operation of user operable control 115 to confirm continued gesture-based operation. The prompt may be issued upon occurrence of a predefined event (e.g., failure to detect any gesture during a predefined time period, change in lighting, failure to detect the user's head, face, or eyes, or any other event that may indicate discontinuation of continued gesture-based operation).

In accordance with some embodiments of the present invention, deactivation of gesture-based operation as a result of failure of the user to confirm continued gesture-based operation may be executed in stages. For example, if no confirmation is detected after a first period (e.g., 30 seconds) from a prompt or from a previous confirmation, some functionality of gesture-based operation is discontinued (e.g., rough head tracking continues). After one or more additional periods (e.g., 2 minutes), further functionality is discontinued (e.g., no tracking) Failure to detect a face or eyes at all may completely discontinue any activity related to gesture-based operation, or may cause device 10 to enter a "sleep" or standby mode.

In accordance with some embodiments of the present invention, or when device 110 is so configured, when gesture-based operation is deactivated, device 110 may continue to track the head and interpret head movement as gestures. However, control functionality is discontinued such that the interpreted gestures do not affect operation of device 110. In this manner, when gesture-based operation is reactivated, no time is lost in initial location of the body parts to be tracked.

In accordance with some embodiments of the present invention, or when device 110 is so configured, and when gesture-based operation is deactivated, some or all operations of gesture-based operation may continue in a limited manner. For example, low resolution images may be acquired, or tracking may continue on the basis of low resolution analysis of acquired images. Different tracking method, techniques, algorithms may be applied when gesture-based operation is deactivated from when gesture-based operation is activated. Such low resolution tracking may yield, for example, a coarse, rough, or low accuracy position of the user's head or eyes. In this manner, electrical power or processing or data storage resources may be conserved. On the other hand, in this manner, upon reactivation of gesture-based operation, the time and resources required for startup and initialization may be reduced. For example, the need upon reactivation of such activities as auto-focus, initial detection, or other activities, may be reduced. As another example, when gesture-based operation is deactivated, analysis of tracked motion to identify corresponding gestures may be discontinued.

In accordance with some embodiments of the present invention, or in accordance with an alternative configuration of device 110, tracking and gesture interpretation may be discontinued when gesture-based operation is deactivated. Discontinuation of tracking and gesture interpretation may enable diverting possibly limited computation or data storage resources of device 110 to other purposes.

In accordance with some embodiments of the present invention, when gesture-based operation is deactivated, device 110 may be powered off or set to a standby mode, or one or more components of device 110 that are not being used (e.g., video camera 12 or other sensor, or a processor that is dedicated to gesture-based operation).

Device 110 may be configurable to select a mode or behavior of device 10 when gesture-based operation is disabled. A configuration may be defined during a setup or initiation phase of an application that is being executed on a processor of device 10. A configuration may be changed by accessing a setup interface or menu during operation of device 10.

User operable control 115 may represent controls that are dedicated for, or specifically designed for, operation in gesture-based operation control. Alternatively, user operable control 115 may represent a multipurpose or context-sensitive control, or a control that is primarily designed to serve a purpose other than gesture-based operation control.

For example, a video game being played on device 110 may involve controlling motion of a simulated vehicle. User operable control 115 may represent a control that is operated to effect motion of the vehicle. When device 110 is configured for gesture-based operation (e.g., by selection of an item or control in a setup menu or screen of the game), operation of that same control may activate or deactivate gesture-based operation. When gesture-based operation is enabled, motion of the vehicle or of a part of the vehicle (e.g., a turret of a simulated tank) may be controlled by deliberate gesturing by the user (e.g., head or eye movements, or arm or finger movements). In some embodiments, operation of a control button or pressing of some other button may continue to perform, control or activate its original function, but may in addition also serve as an indication that the user's gestures are to be monitored and/or interpreted as gestures for purposes of gesture based operation of other functions. For example, a user may press a button that activates an accelerator of a tank in a game. Pressing the accelerator button may also activate a gesture monitoring or control function so that when the tank is moving in response to the pressed accelerator, the gestures of the player are monitored for purposes of activating gesture based control of the tank turret.

As another example, user operable control 115 may represent a control such as a power control, volume control, or other control button of device 110 (e.g., located on a side panel of a mobile device). Concurrent operation of a predetermined combination of such buttons may activate or deactivate gesture-based operation. Alternatively, another previous operation may reconfigure the control for gesture-based operation control, so that a first function of a button or input, such as a volume control button, becomes either in addition or in the alternative, a gesture based control activation button.

As another example, user operable control 115 may represent a pressure sensor or pressure sensitive component of device 110. Thus, user operable control 115 may be operated for gesture-based operation control by gently squeezing the component. As another example, user operable control 115 may represent an accelerometer or other motion sensor of device 110. Thus, user operable control 115 may be operated for gesture-based operation control by shaking or otherwise moving device 110 in a predetermined manner. As yet another example, user operable control 115 may represent a microphone or other sound sensor. Thus, user operable control 115 may be operated for gesture-based operation control by producing a predetermined sound (e.g., spoken work or phrase, clap, click, whistle, or other sound). As yet another example, user operable control 115 may represent a function of video camera 112. Thus, a gesture by the user may modify a manner in which gestures are monitored (e.g., changing the set of gestures used, or changing application or function that is controlled by gesture-based operation).

Figure 3:
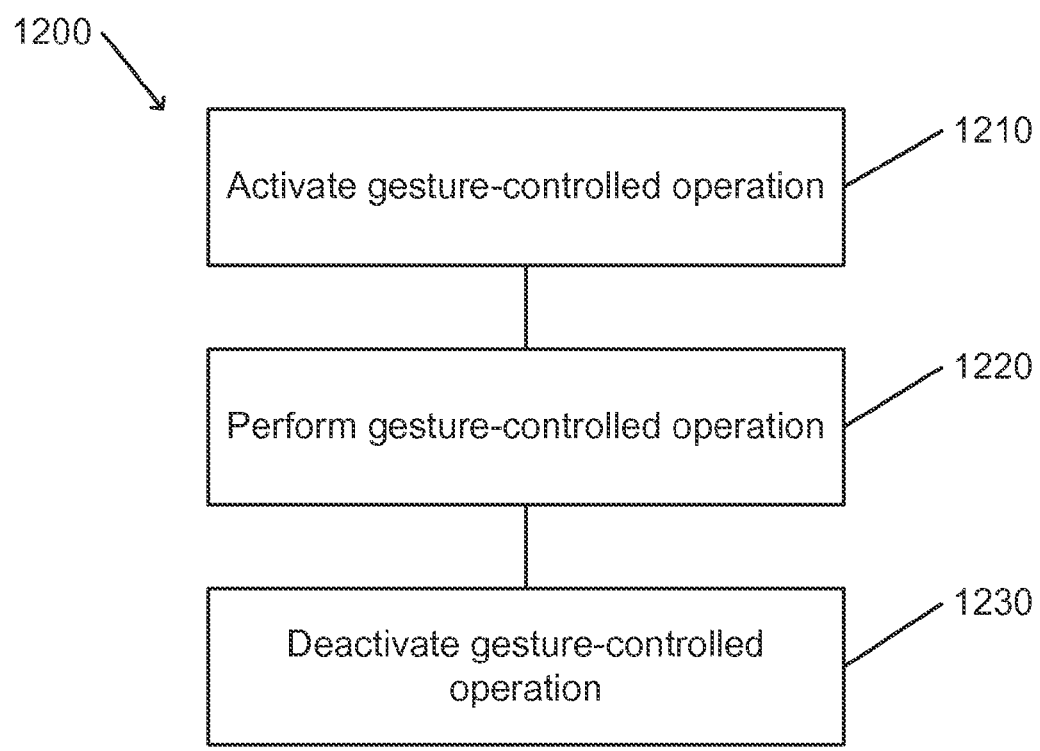
FIG. 3 is a flow chart depicting a method for gesture-based operation control, in accordance with an embodiment of the present invention.

FIG. 3 is a flow chart depicting a method for gesture-based operation control, in accordance with an embodiment of the present invention.

It should be understood with respect to any flowchart referenced herein, that the division of the depicted method into separate operations represented by blocks of the flowchart has been selected for convenience only. Alternative division of the depicted method into discrete operations is possible with equivalent results. Such alternative division of the depicted method into discrete operations should be understood as representing embodiments of the present invention.

Furthermore, it should be understood that unless indicated otherwise, that the illustrated order of operations of the depicted method as represented by the positions of the blocks in any flowchart referenced herein has been selected for convenience only. Execution of the illustrated operations in alternative order, or concurrent execution of operations of the depicted method, is possible with equivalent results. Any such reordering of operations of the depicted method should be understood as representing an embodiment of the present invention.

Gesture-based operation control method 1200 may be implemented by a processor of a device that is configured for gesturer monitoring.

Gesture-based operation control method 1200 includes activation of gesture-based operation (block 1210). Activation of gesture-based operation may include initializing execution of an application that enables controlling a device using gesture-based operation. Activation of gesture-based operation may include operating one or more controls to indicate that some or all tracked motion of one or more body parts is to be interpreted as a gesture. Activation of gesture-based operation may include one or more initialization or calibration procedures. For example, a body part to be tracked may be located within a sequence of acquired images. A body part may be imaged when placed in a standard position or orientation.

Performance of gesture-based operation proceeds (block 1220). For example, gesture-based operation may be used to control motion or the appearance of a displayed object on a display screen of the device. For example, gesture-based operation may be used to activate a dialing function of a phone application, or may control motion of displayed representation of an object for a game application.

Gesture-based operation may be deactivated (block 1230). For example, user may terminate an application or operate a control to deactivate gesture-based operation, or gesture-based operation may be deactivated automatically under predefined circumstances.

Figure 4:
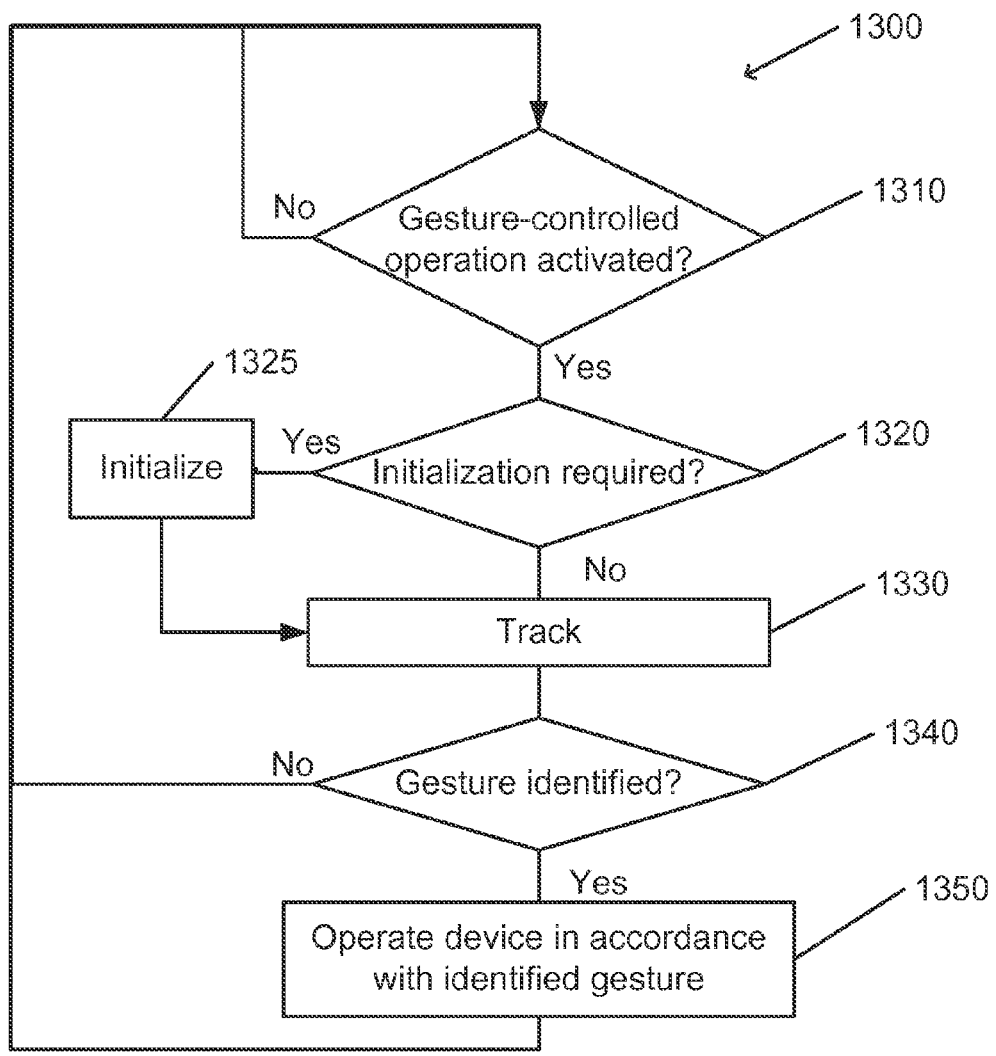
FIG. 4 is a flowchart depicts a variant of the gesture-based operation control method depicted in FIG. 3.

FIG. 4 is a flowchart depicts a variant of the gesture-based operation control method depicted in FIG. 3.

Gesture-based operation control method 1300 includes determining whether gesture-based operation is activated (block 1310). Determining whether gesture-based operation is activated may include one or more of: determining whether an gesture-based operation application is being executed, determining whether a camera is operating, determining whether a body part is being tracked, determining whether the device is in a gesture-based operation state, determining whether a control (e.g., pushbutton or other control) for activation gesture-based operation is being operated or has been operated, or another condition that is prerequisite or indicative of gesture-based operation being activated.

If gesture-based operation is not activated, no further action regarding gesture-based operation is taken. Determination of whether gesture-based operation is activated (repeating block 1310) may continue periodically or in response to one or more events (e.g., activation of an application or control related to gesture-based operation).

If gesture-based operation is activated, it may be determined whether initialization is required (block 1320). For example, values of one or more parameters may be checked for validity, or one or more states of the device or of running applications may be checked. If initialization is required, the device is initialized (block 1325). For example, one or more initialization or calibration procedures may be performed. A user of the device may be prompted to perform one or more actions or to enter one or more values. In some embodiments, the calibration or initialization may be performed when the user presses a button a otherwise inputs a signal to an input device associated with the electronic device. Such push of the button may enable the gesture detection or otherwise serve as a signal that detected gestures are to be acted upon.

After performing initialization, if needed, or after any required initialization had been previously performed, one or more parts of the user or of another imaged person or object are tracked (block 1330). For example, the eyes, face, head, or other body parts (e.g., finger or hand) of a user may be tracked.

One or more tracked motions of the tracked part may be identifiable as corresponding to or associated with a gesture (block 1340). For example, one or more motions of tracked eyes, face, head, fingers, or other body part may be identifiable as a gesture of a list of gestures. For example, one or more parameters that characterize the tracked motion may match a characterization of a gesture (e.g., turn eyes or head, looking in particular direction, or other motion of tracked eyes or part).

If the tracked motion is not identifiable as a gesture, execution of gesture-based operation control method 1300 continues (returning to block 1310).

If the tracked motion is identifiable as a gesture, the device is controlled in accordance with the identified gesture (block 1350). The identified gesture may be interpreted as a command (e.g., by application of a function or table that relates identified gestures with commands). The command may affect operation of the device (e.g., selection of an option or movement of a displayed screen object). After controlling the device, execution of gesture-based operation control method 1300 continues (returning to block 1310).

Figure 5:
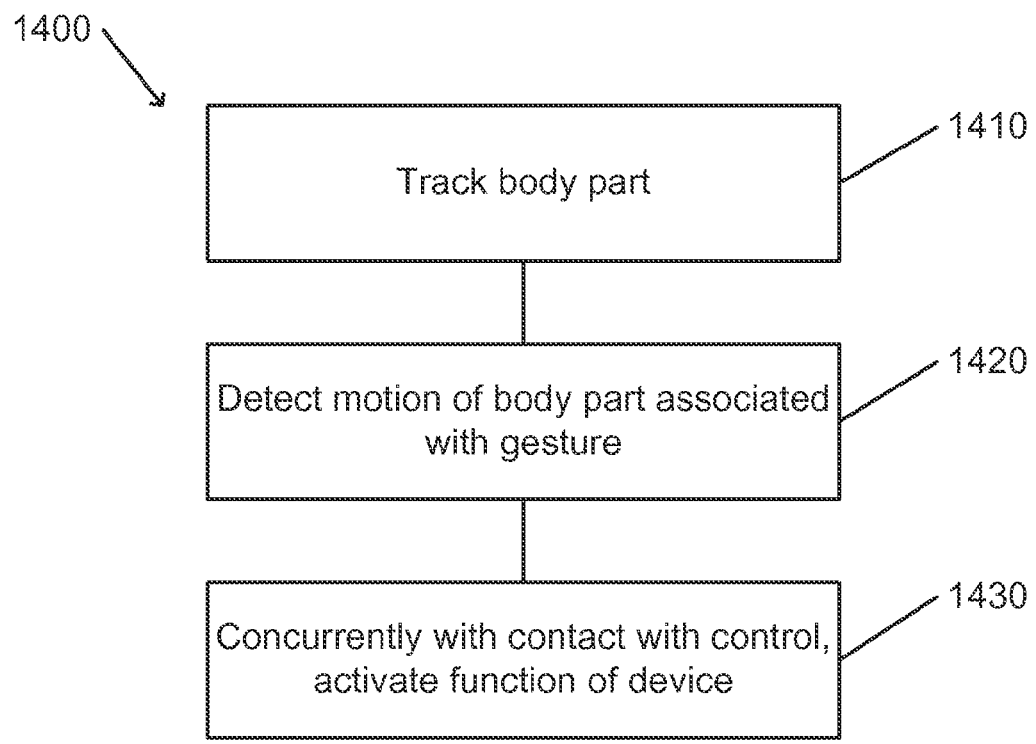
FIG. 5 is a flowchart depicts a variant of the gesture-based operation control method depicted in FIG. 3.

FIG. 5 is a flowchart depicts a variant of the gesture-based operation control method depicted in FIG. 3.

Gesture based function control method 1400 may be executed to activate a function of an electronic device. A body part of a user of the device is tracked in a series of images that are acquired by a camera or other imaging device of the electronic device (block 1410). A motion of the tracked body part that corresponds to a pre-defined gesture by that body part may be detected (block 1420). A function of the electronic device that is associated with the gesture may be activated when a control of the device is concurrently contacted by the user (block 1430). In some embodiments, a signal from an input device, such as a press of a button associated with the electronic device may enable, turn on, activate or initiate a process to interpret detected gestures as an instruction to implement or activate a gesture based function. The push of the button may enable the implementation of the gesture activated function, and the detection of the gesture may serve as the trigger to function.

In accordance with embodiments of the present invention, a device, such as a mobile device, includes (e.g., incorporates or is associated with at a fixed distance) a display screen on which an image may be displayed, and an imaging device for acquiring images or frames (hereinafter, frames). Reference hereinafter to mobile devices should be understood as including stationary devices as well. For example, the imaging device may be aimed so as to acquire a frame that includes an image of a user or viewer of the mobile device when the user is viewing the displayed image. A processor of the mobile device may be configured to analyze acquired frames that include images of the user so as to detect relative motion, such as increases in distance between the mobile device and the user. When the mobile device is so configured, some detected relative motions or changes in position or assumption of a new position by the user or between the user and the mobile device may be identified as a zoom gesture. In response to the identified zoom gesture, a zoom function may be applied to all or part of the displayed image.

Relative motion between the mobile device and the user may be detected by analysis of acquired frames that include images of the user's eyes, head, face, or body. A detected motion that may be identified as a zoom gesture or as a component of a zoom gesture may include tilting, leaning, or movement of the eyes, head, or face, toward or away from the mobile device, or corresponding motion of the mobile device. In some embodiments, examples, characteristics, coordinates or vectors may be stored in a memory and pre-defined as gestures that are to be associates with a zoom or other function.

For example, detected motion that includes a change in distance between the user and mobile device, or a sequence of such changes, may be interpreted or identified as a zoom gesture. In response to an identified zoom gesture, an image, or part of an image, that is displayed on the display screen of the mobile device may be zoomed so as to be enlarged (e.g., to show more detail of a displayed object or document) or reduced (e.g., to show more of a displayed object or document at lower resolution). Other changes in the displayed image may accompany the zooming. For example, when zoomed, a displayed image may be panned, or a perspective or other characteristic or feature of the displayed image may be modified.

A detected change in distance of the user from the device may include a calculation of a relative change in distance from a previous distance, or may include calculation of an absolute distance (e.g., in length units such a centimeters). A change in distance or an absolute distance may be inferred from measurements in one or more acquired frames. For example, a pixel distance may be measured between images of two facial features (or other body features) within a single acquired frame. A pixel distance between two points of an image of single feature (e.g., length, width, or other dimension) may be measured. A change in distance may be inferred from a change in the measured pixel distance from one acquired frame to another.

If at some point, e.g., as part of a setup or calibration procedure, a reference distance is measured, then an absolute distance may be inferred from a measured pixel distance. For example, during a calibration procedure or at some other time, the mobile device may be placed at a predetermined position relative to the user while a frame is acquired. Alternatively, a distance corresponding to a pixel distance (e.g., a measured length, width, or other dimension of a feature that is imaged) may be independently measured and the measured value entered via a user interface of the mobile device. Other calibration or distance measurements are possible.

Detection of a distance between the user and the mobile device, or change in this distance, may be inferred from a measured pixel distance in an acquired image of the user. For example, a pixel distance between two eye images within a face image may be measured. Other pixel distances related to one or more other imaged features in an acquired frame may be measured. For example, a pixel distance corresponding to a distance between opposite corners of an eye, a diameter of an iris, or dimensions of other features may be measured. An absolute distance between the user and the mobile device may be inferred from a measured pixel diameter of an iris image, a field of view of the camera, and from the almost constant size of the iris among almost all human beings of almost all ages (approximately 1.18 cm). The pixel distance may be substantially proportional to an angle subtended by the imaged feature, and thus substantially inversely proportional to the distance of the imaged feature from the imaging device. Similarly, a change in distance may be inferred from differential changes in two images of features at different distances (the difference being known) from the imaging device (e.g., two eyes whose distances are different due to the user's head being turned).

A rate of change of the pixel distance over time may be indicative of a speed of a change in distance between the imaged feature and the imaging device.

For example, an eye image may be detected in an acquired frame using a method that is described in PCT Application No. PCT/IL2013/050072, which is incorporated in its entirety herein by reference. Other eye detection or tracking techniques may be used. One or more features of a head or face may be detected. A face may be detected in an acquired image of frame by application of a face detection algorithm or object detection algorithm. For example, a real time face detection algorithm may be applied. Such an algorithm may include utilizing the Viola-Jones object detection algorithm (using Haar features), or various other face detection algorithms included in the Open Source Computer Vision Library (OpenCV) or elsewhere. Application of such a face detection or object detection algorithm may detect boundaries of one or more features of a face image in an acquired frame (e.g., features of a face such as an eye strip, an eye region, a nose, or glasses). Application of the face or object detection algorithm may indicate boundaries (e.g., based on a known relationship among facial elements) of one or more regions of the face, such as an eye region.

Measurements from other distance sensors or measurements may be utilized. For example, the imaging device may be provided with an auto-focus capability. The auto-focus capability may include a rangefinder or similar sensor (e.g., optical or sonic) or may be based on image processing on acquired frames. A distance measurement may include a parallax or triangulation technique utilizing frames that are acquired by two cameras or imaging devices. Other methods may be used to measure a distance.

A detected change in distance or new distance may be compared to a threshold value. When the change in distance is less than a distance threshold, or when a rate of change is less than a speed threshold, the change may be ignored. When the change is ignored, no zoom control is applied to the displayed image. For example, a detected movement whose distance or speed is less than the corresponding threshold value, hereinafter the ignore threshold, may represent natural, involuntary, or unconscious movement of the user or of the mobile device.

For example, a distance-based ignore threshold may be expressed in length units. For example, a distance threshold may be set at one centimeter, one inch, or another value. Similarly, a detected movement over a distance exceeding a maximum distance value (e.g., a typical arm's length, one meter, or another distance) may be ignored (e.g. as being unlikely to represent a voluntary zoom gesture). Thus, a zoom gesture may include detected movements with distances in a gesture range.

A speed-based ignore threshold may be expressed in units of speed (e.g., centimeters per second). Alternatively, a speed-based ignore threshold may be expressed as a minimum time during which the detected movement occurs (e.g., one second or another value). A slower speed of the detected movement may indicate a natural movement of the user or of the mobile device. Similarly, a detected movement whose speed exceeds a maximum value may be ignored (e.g., as likely indicating that the mobile device was dropped or jarred).

A zoom gesture may include a detected motion in a single inward (shortening the distance between the user and the mobile device) or outward (increasing the distance between the user and the mobile device) direction, or may include two or more motions in succession, such as a quick reduction in the distance between a user and a screen, followed by a slow increase between the user and the screen.

A zoom function in response to a zoom gesture may enlarge or increase a displayed image without adding information (e.g., involving simple interpolation operations). A zoom function may include adding previously omitted detail when zooming in, or hiding previously displayed detail when zooming out. Examples of the latter are commonly found, for example, in geographical map applications where additional details on the map are added in a zoom or removed in a pan. Similar zooming function may be applied to other diagrammatical or learning applications. For example, zooming into a node of a network diagram may show details of that node. Zooming into a diagram of a biological or other specimen may show structure at increasingly finer levels (e.g., organ, tissue, cell, cell nucleus, molecule, atom, or atomic nucleus). As another example, a web site (such as a news portal) may include titles or short descriptions of articles. Zooming in to the web site may cause the full article to appear, while zooming out returns to the previous (e.g., portal) level.

A zoom function may be configured to enable comfortable viewing of a displayed image throughout a range of distances. For example, displayed text (or another image) may be enlarged as a distance between the display screen and the user is increased. Increasing the distance may thus cause a font size of the displayed text to be increased (while the amount of displayed text is decreased). Decreasing the distance may cause the font size to decrease, while showing more of the text.

A detected distance between the user and the mobile device upon completion of the zoom gesture may indicate an extent of zooming (e.g., magnification or other measure of zooming extent).

For example, a zoom gesture that begins with a detected inward movement may be interpreted as a request to zoom in. Similarly, a zoom gesture that begins with a detected outward movement may be interpreted as a request to zoom out. The interpretation may be reversed. For example, a detected outward movement may be interpreted as a request to zoom in, while a detected inward movement may be interpreted as a request to zoom out.

A zoom gesture may include a rapid (as determined by a speed threshold) movement inward or outward. In response, the zoom may be increased or decreased by a predetermined amount (e.g., in predetermined stages) or may be determined by a distance or speed of the detected movement. The displayed image may retain the indicated zoom after completion of the zoom gesture. As another example, a zoom gesture may include maintaining a distance between the user and the mobile device for a predetermined period after completion of the movement. Maintaining the distance may be interpreted as indicating that the user wishes the indicated zoom to be maintained.

A zoom gesture may indicate continuous zooming in or out until another gesture (or other action) indicates completion of the zooming. For example, a detected distance between the user and the mobile device upon completion of the movement, or a change in distance during the course of the gesture, may indicate a rate of the zooming.

A zoom gesture may include successive detected movements. For example, a first movement may result in zooming of the displayed image by an initial amount. Further detected movement may be indicative of adjustment to the zoom such that the zoom is responsive in real-time to the changing distance.

In accordance with some embodiments of the present invention, a detected motion may be interpreted as a zoom gesture only when the movement is initiated from a predetermined range of initial positions (e.g., distances between the user's face and the imaging device of the mobile device). For example, a range of initial positions may be determined during a setup or initialization procedure.

In accordance with some embodiments of the present invention, gesture-based zoom control may be initiated or triggered by a user action. For example, gesture-based zoom control may be triggered by a detected inward movement followed, within a predetermined time window, by a detected outward movement (or another sequence of one or more successive movements). As another example, gesture-based zoom control may be triggered by a detected facial gesture (for example, closing or winking an eye, or another facial gesture), by creation of an audible sound (e.g., speech, clicking, whistling, clapping, finger snapping, or another sound) or by contacting or otherwise operating a control (e.g., button, switch, touch screen, key, pointing device, or other control). Other actions, or detected movements or gestures, may trigger gesture-based zoom control.

After triggering, gesture-based zoom control may operate for a predetermined period of time, or until a terminating action terminates gesture-based zoom control. A subsequently detected movement (or series of movements) that corresponds to a zoom gesture may then activate a zoom function of the display screen.

In accordance with some embodiments of the present invention, a detected motion may be interpreted as a zoom gesture only when concurrently accompanied by a triggering action (e.g., a detected gesture, such as closing one eye, or contact with a control).

When a detected movement includes a zoom gesture, following gestures may be ignored for a predetermined period of time. For example, following a zoom gesture in which a detected inward movement from an initial distance, a zoom function of the display screen may not be activated until a subsequent movement that restores the initial distance is detected. In this manner, zooming of the displayed image is not performed until the user is at a comfortable distance from the display screen. As another example, following a zoom gesture that includes a detected inward movement, subsequent detected outward motion may be ignored for a predetermined period of time. In this manner, the user may restore a comfortable viewing distance following the zoom gesture. Other combinations of detected movement may be involved.

In accordance with an embodiment of the present invention, a zoom function of a displayed image may include a series of discrete zoom levels (e.g., similar to a zoom menu function of some applications. In this case, an identified zoom gesture may cause a change from one level to another. The number of levels involved in the change may be determined by the gesture. For example, a zoom gesture that includes a small detected movement (e.g., one centimeter) may result in a correspondingly small (e.g., 20%) change in zoom level. A zoom gesture that includes a larger detected movement (e.g., 10 centimeters) may result in a correspondingly larger (e.g., 200%) change in zoom level.

In accordance with an embodiment of the present invention, control of a zoom function may include setting a zoom level in accordance with a detected distance upon completion of the zoom gesture. For example, an element of a displayed image may have dimensions of 100 pixels×100 pixels at a distance of 50 centimeters. When, as a result of a zoom gesture, the distance is reduced to 25 centimeters, the size of the element may be changed (e.g., linearly or non-linearly) to 200 pixels×200 pixels.

In accordance with an embodiment of the present invention, control of a zoom function may include setting a zoom level in accordance with a detected speed of a zoom gesture. For example, a rapid zoom gesture may result in a large change in zoom level, whereas a slow zoom gesture may result in a small change in zoom level.

In accordance with an embodiment of the present invention, control of a zoom function may include changing a zoom in accordance with a detected combination of speed and distance of a zoom gesture. For example, a change in zoom level may be determined by a product of speed and distance of a zoom gesture where a change in zoom level is proportional to both the speed and the distance. A change in zoom level may be determined by another functional or other relationship that relates a zoom level, or a change in zoom level, to a speed, distance, and direction of a zoom gesture.

In accordance with embodiments of the present invention, gesture-based zoom control may apply to the entire displayed content of a display screen, or to one or more elements of the displayed content. For example, the zoom control may apply to a displayed image or text (e.g., a selected picture or displayed document), but not to surrounding items (e.g., icons or screen controls). An element to which gesture-based zoom control is applied may be selected by a user who is viewing the display screen (e.g., by operating a screen control or pointing device, and indicated by a cursor, outline, shading, or other indication), or may be selected automatically (e.g., based on content, context, or otherwise on programmed instructions).

In accordance with an embodiment of the present invention, an element to which gesture-based zoom control is applied may be selected by determining an element at which the user is currently looking. The user may be looking at the element during, or immediately prior to, the zoom gesture. For example, an element being looked at may be determined by applying an eye tracking algorithm (e.g., as described above), or or another computer vision, eye tracking, or gaze tracking technology (for example, Tobii T60 or another gaze tracking technology).

In accordance with an embodiment of the present invention, application of gesture-based zoom control may immediately change a zoom level that is indicated by the zoom gesture. Alternatively, application of gesture-based zoom control may gradually change a zoom level. The rate at which the zoom level is gradually changed may be determined by the zoom gesture (e.g., a zoom rate determined in accordance with a detected speed of the zoom gesture).

Methods, techniques, or algorithms that are utilized by application of gesture-based zoom control, in accordance with embodiments of the present invention, may be applied to other interactions with a device, such as a mobile device. For example, a method, technique, or algorithm of gesture-based zoom control may be applied to indicate operation a click interaction, a focus function, or another interaction or function of a user interface.

Figure 6:
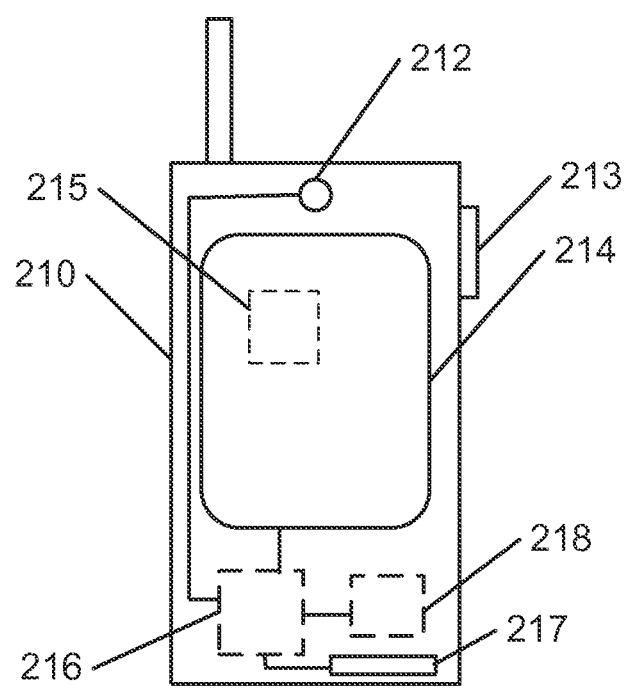
FIG. 6 is a schematic diagram of a device that may be configured for gesture-based zoom control, in accordance with an embodiment of the present invention.

FIG. 6 is a schematic diagram of a device that may be configured for gesture-based zoom control, in accordance with an embodiment of the present invention.

Device 210 may include a stationary or portable computing device, such as a handheld computer, tablet computer, mobile phone, or smart phone. Device 210 includes an imaging device represented by video camera 212. Video camera 212 may be understood to include any device (e.g., operating to acquire images using visible, infrared, or other radiation), such as a camera, three-dimensional imager, scanner, or other device a that is capable of acquiring a series of frames that contain images, or other spatial information, regarding an imaged object, such as a user's eyes, face, head, or body. Sensors other than an imager may be used, such as for example an infra red sensor, temperature sensor, accelerometer or micro-phone, or other sensor that may detect a motion of a device or of a user relative to the device, or a proximity or change in a proximity of the user to the device.

Device 210 may include a motion sensor 217. Motion sensor 217 may include one or more sensors for measuring a change in velocity, rotation, or orientation of device 210. For example, motion sensor 217 may include an accelerometer, a gyroscope, compass, level, or other component capable of detecting a change in velocity or orientation of device 210.

Device 210 includes, or is associated with, processor 216. Processor 216 may receive a video signal, or other video or image data from video camera 212. Processor 216 may operate in accordance with programmed instructions.

Programmed instructions for operation of processor 216 may be stored on data storage unit 218. Programmed instructions may include instructions for gesture-based zoom control in accordance with an embodiment of the present invention. Data storage unit 218 may include one or more fixed or removable, non-volatile or volatile, data storage units or computer-readable media that is capable of storing data for use by processor 216. Data storage unit 218 may be used to store, e.g., in the form of frames, video or image data that is acquired using video camera 212. Data storage unit 218 may be used to store data for use by processor 216 in displaying an image on display screen 214. Data storage unit 218 may be used to store one or more parameters for operation of processor 216, or one or more results of a calculation performed during operation of processor 218.

Processor 216 may control display of an image, e.g., of textual or graphical content, on display screen 214. For example, processor 216 may control scrolling, panning, or zooming of the displayed content. Processor 216 may be configured to modify displayed content on display screen 214 in accordance with a result of gesture-based zoom control.

A device (e.g., device 210) configured for gesture-based zoom control, in accordance with an embodiment of the invention, may include, for example, one or more processors (e.g., processor 216), memory or data storage devices (e.g., data storage unit 218), or imaging or image capture devices or sensors (e.g., video camera 212).

Figure 7:
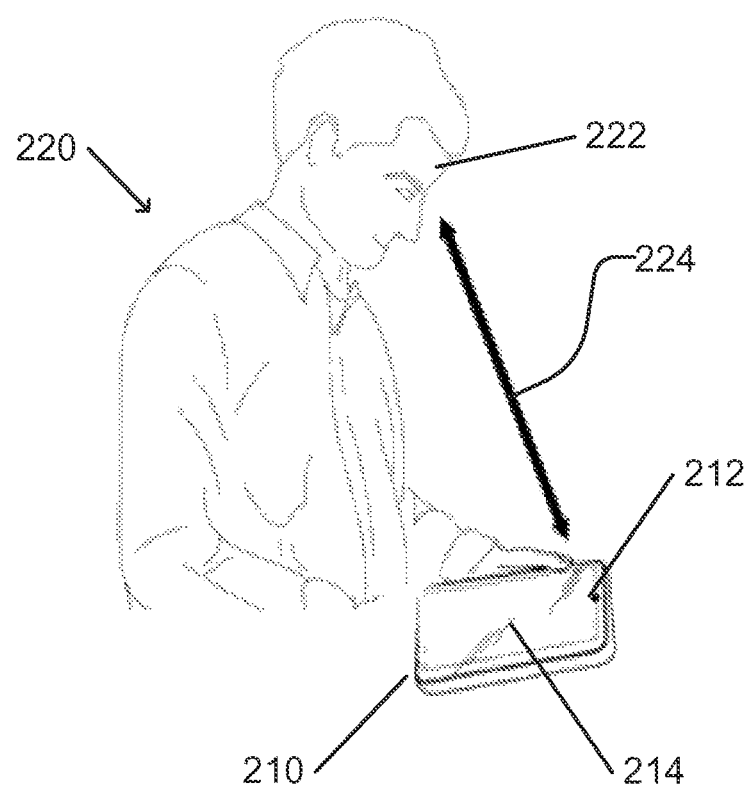
FIG. 7 schematically illustrates gesture-based zoom control, in accordance with an embodiment of the present invention.

FIG. 7 schematically illustrates gesture-based zoom control, in accordance with an embodiment of the present invention.

User 220 may view a displayed image that is displayed on display screen 214 of device 10. Video camera 212 may acquire frames that include acquired images of user 220. In particular, video camera 213 may acquire images of head 222 of user 220 (e.g., of facial features of head 222, such as eyes or other facial features, an outline of head 222, or of another body part, such as a neck or shoulder, that is indicative of a location of head 222.

Distance 224 between head 222 and device 210 (e.g., video camera 212 of device 210) may be varied. For example, distance 24 may increase or decrease. A change in distance 224 may result from motion of head 222, of device 210, or both. A change in distance 224 may be detected by analysis of frames that are acquired by video camera 212. A detected change in distance 224 may be interpreted as, or may correspond to, a zoom gesture.

Figure 8:
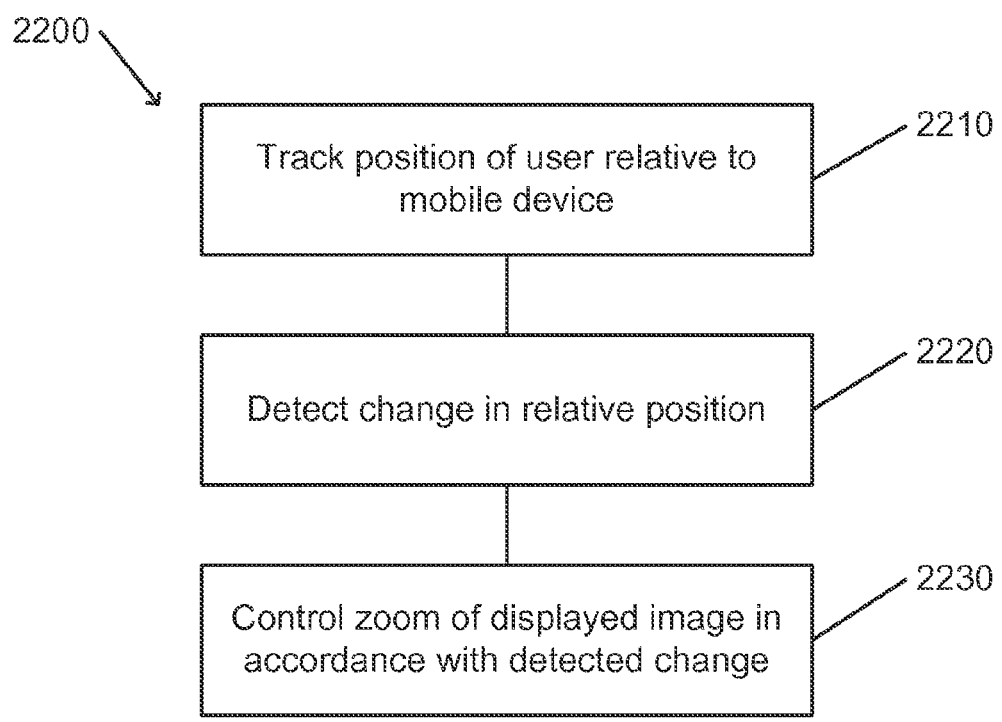
FIG. 8 is a flow chart depicting a method for gesture-based zoom control, in accordance with an embodiment of the present invention.

FIG. 8 is a flow chart depicting a method for gesture-based zoom control, in accordance with an embodiment of the present invention.

It should be understood with respect to any flowchart referenced herein, that the division of the depicted method into separate operations represented by blocks of the flowchart has been selected for convenience only. Alternative division of the depicted method into discrete operations is possible with equivalent results. Such alternative division of the depicted method into discrete operations should be understood as representing embodiments of the present invention.

Furthermore, it should be understood that unless indicated otherwise, that the illustrated order of operations of the depicted method as represented by the positions of the blocks in any flowchart referenced herein has been selected for convenience only. Execution of the illustrated operations in alternative order, or concurrent execution of operations of the depicted method, is possible with equivalent results. Any such reordering of operations of the depicted method should be understood as representing an embodiment of the present invention.

Gesture-based zoom control method 2200 may be implemented by a processor of (e.g., incorporated in or associated with) a mobile device that is configured for gesture-based zoom control.

A position of a user relative to the mobile device may be tracked (block 2210). For example, images of an eye, face, head, or body of the user may be acquired in a frame that is acquired by an imaging device of the mobile device. The acquired images may be analyzed to determine a distance, or other relative position, between the user and the mobile device. The determined distance may be expressed as a distance between the user (e.g., an eye, facial feature, or other body part) and an imaging device of the mobile device, between the user and a display screen of the mobile device, between the user and a displayed element on display screen of the mobile device, or between the user and another part or component of the mobile device.

A change in the relative position may be detected (block 2220). For example, a change in distance may be detected in a series of acquired frames that include images of the user. A detected position of the user in one acquired image may be compared with a detected position of the user in a previously acquired image.

Zooming of a displayed image, or an element of a displayed image, may be adjusted or controlled in accordance with or as a function of the detected change in relative position (block 2230) or in accordance with a new position relative to a position in a prior frame. For example, the detected change may correspond to a zoom gesture and decrease in the distance between the user or viewer and the screen may increase the zoom of the displayed elements on the screen. A detected change may correspond to a zoom gesture if the change is characterized by a distance or speed that meets one or more conditions. For example, an inward or outward change in distance may be within a range of distances corresponding to a zoom gesture. A speed of the change in distance may be within a range of speeds that corresponds to a zoom gesture.

A series of two or more successive motions may correspond to a zoom gesture.

In some embodiments, an area (e.g., area 215 in FIG. 6) or element that is displayed on a screen and that is to be a subject of the zoom may be highlighted, or subject to some other visual indication before the zoom is initiated. For example, a gaze tracking function may detect that a viewer is looking at a particular area or element on a display. The detected gaze point may be highlighted, darkened, made to blink or subject to some other visible marking, as an indication that the element or area is to be the subject of a function, and a gesture that may be interpreted as a zoom gesture may then be activated in respect of the highlighted area or element on the display.

In some embodiments a zoom and pan of an image or displayed element may be executed in real-time and in direct response to a change in distance of the device from the user. For example, once activated, a zoom function may zoom a little in response to a small change in distance of the device from the user, or a great deal in response to a large change in such distance. A percentage or extent of the zoom may be determined for example, as a function of the percentage or other extent in the change in the distance from the initial distance of the user from the device. In such case, the data to be displayed upon such zoom or pan may be pre-stored or loaded into the device, so that the zoom and pan may be executed in real time with the change in distance. Such real-time zoom and pan may be analogous to the use of a magnifying glass with an object, where the magnification of the object is changed concurrently with the change of the distance between glass and the object.

In some embodiments, the zoom or pan function may be activated or remain activated only when for example another action is taken by a user. For example, a user may hold or press a button or other control (e.g., control button 213 in FIG. 6) associated with the device, or perform another input action which may activate the zoom function. Once activated, a change in distance may result in a change in the zoom or pan of the displayed image.

Figure 9:
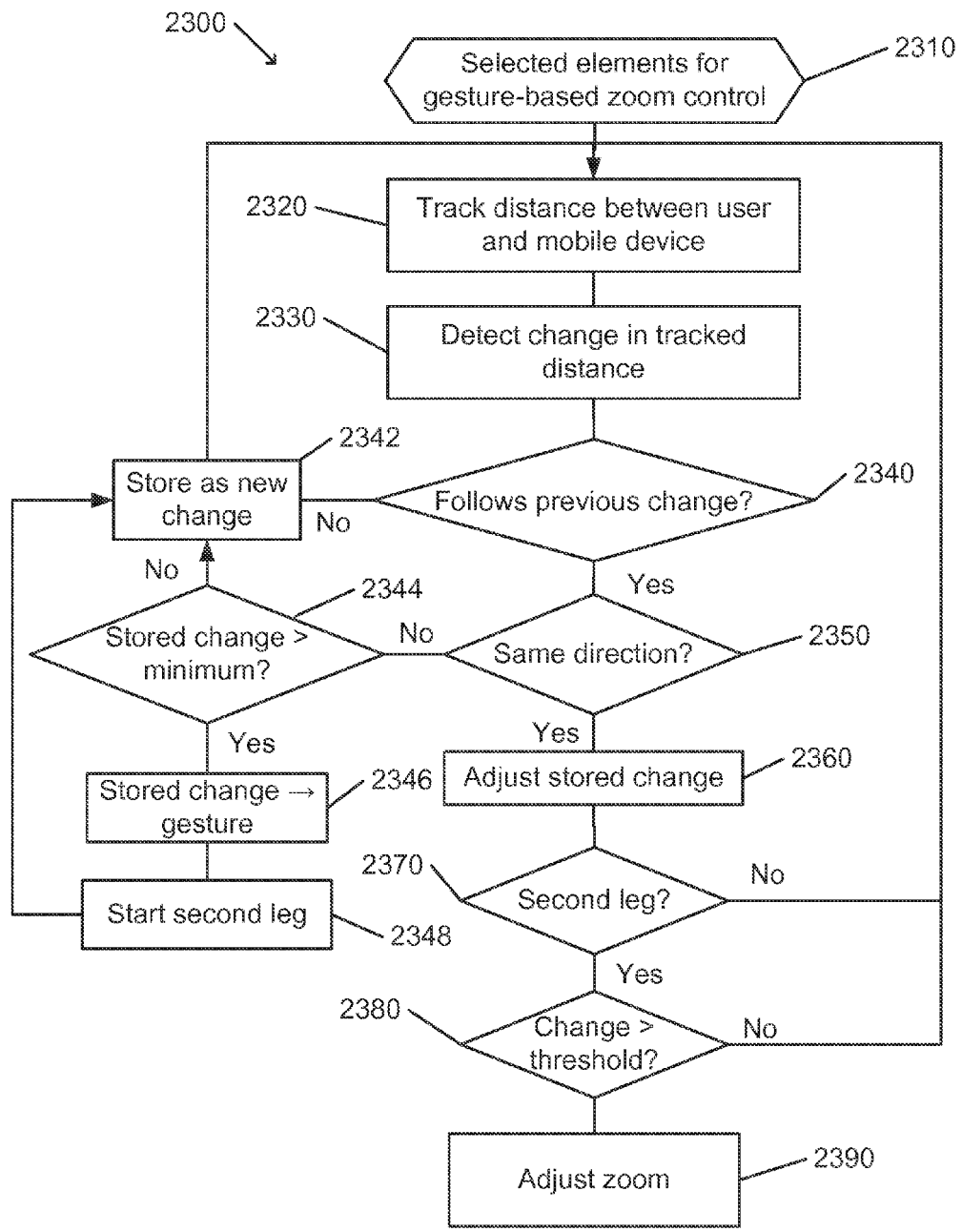
FIG. 9 is a flowchart depicts a gesture-based zoom control method, in accordance with an embodiment of the present invention, in which a gesture includes two motions in opposite directions.

FIG. 9 is a flowchart depicts a gesture-based zoom control method, in accordance with an embodiment of the present invention, in which a gesture includes two motions in opposite directions.

Gesture-based zoom control method 2300 assumes a zoom gesture that includes two legs. A first leg of the zoom gesture includes a change in distance between a user and a mobile device in one direction (e.g., inward or outward). A second leg of the zoom gesture includes a change in distance in an opposite direction (e.g., outward or inward).

Gesture-based zoom control method 2300 may be executed, e.g., by a processor of a mobile device, when one or more elements of a displayed image have been selected for gesture-based zoom control (block 2310). For example, the selected elements may include an entire image (e.g., user interface) that is displayed on a display screen of the mobile device. The selected elements may be indicated by an appropriate indication. The elements may have been selected by the user, or may have been automatically selected by an application that is being executed on the mobile device.

A distance between the user (e.g., eye, facial feature, or other body part) and the mobile device (e.g., camera or other imaging device, display screen, or element of image displayed on display screen) may be tracked (block 2320). For example, the distance may be tracked by analysis of a series of images of the user that are acquired by an imaging device of the mobile device.

A change in the tracked distance may be detected (block 2330). For example, the change may have been detected by comparing a distance that is calculated by analysis of an acquired image of the user, with a distance that results from analysis of a previously acquired image.

The detected change may follow a stored change that represents a previously detected change (block 2340). For example, the detected change may be detected within a predetermined time period following a previously detected change (e.g., the time from the previously detected change is less than a threshold value).

If the detected change does not follow the previously detected change, the magnitude (distance) and direction of the change are stored as a new change (block 2342). For example, a time from the previously detected change may exceed a threshold value (e.g., possibly indicating no connection between the detected changes). Tracking continues (returning to block 2320).

If the detected change follows the previously detected change (e.g., occurs soon afterward) the direction of the detected change may be compared with a direction of the stored previously detected change (block 2350).

If the direction is different (possibly indicating a second leg of a zoom gesture), the magnitude of the stored change may be compared with a threshold value that represents a minimum distance (block 2344).

If the magnitude of the stored change is smaller than the threshold distance (e.g., indicative that the stored change does not represent a first leg of a zoom gesture), the detected change is stored in place of the previously stored change (block 2342), thus initializing the change for the new direction of motion, and tracking continues (returning to block 2320).

If the magnitude of the stored change is found to exceed the threshold distance (e.g., indicative that the stored change may represent a first leg of a zoom gesture) in the operation indicated by block 2344, characteristics of the stored change are interpreted as a first leg of a gesture (block 2346). For example, a magnitude of the first leg may be indicative of a change in zoom level of a selected element of the displayed image. A direction of the first leg may be indicative of direction (e.g., enlarging or reducing) of a change in zoom level of the selected element.

The detected change may be considered as a candidate motion to begin a second leg of the gesture (block 2348). Any following detected changes (within the threshold time period and until another change in direction) may thus also be considered to represent segments of the second leg.

The detected change is stored in place of the previously detected change (block 2342) and tracking continues (returning to block 2320).

If, as determined in the operation that is represented by block 2350, the detected change is in the same direction as the stored change (e.g., indicating continuation of a single change) the stored change is adjusted (block 2360). For example, the magnitude of the detected change may be added to the magnitude of the stored change, and stored in its place.

It may have been previously determined (e.g., in an operation as represented by block 2348) that the detected motion represents a segment in a second leg of a zoom gesture (block 2370). If not (e.g., indicating that the gesture cannot yet be complete), tracking continues (returning to block 2320).

If the detected motion represents a segment in a second leg of a zoom gesture, the magnitude of the adjusted stored change is compared with a threshold value representing a minimum distance (block 2380). If the magnitude of adjusted stored change does not exceed the threshold value (e.g., indicating that the detected change cannot represent the end of a complete zoom gesture), tracking continues (returning to block 2320).

If the magnitude of adjusted stored change exceeds the threshold value (e.g., indicating that a zoom gesture is complete) the zoom of one or more selected elements of the displayed image may be adjusted as indicated by the zoom gesture (block 2390). For example, one or more characteristics (e.g., magnitude, direction, speed) of the first leg of the zoom gesture may indicate a change in zoom level (or a rate of change of zoom level). The second leg may then indicate that the zoom gesture is complete. If, on the other hand, a characteristic of the second leg of the zoom gesture indicates a change in zoom level, a zoom level of the selected element may continue to be adjusted as long as a detected change follows a previous change in the same direction.

In accordance with embodiments of the present invention, analysis of a series of acquired images of a user who is viewing a display screen may reveal movement or the assumption of a new, different, particular or predefined orientation of the user's body, head, face, or eyes. If the detected movement corresponds to pre-defined criteria, content that is displayed on the display screen may be altered. For example, a displayed portion of an image or document may be altered by scrolling so as to display an adjacent or other portion of the image or document that was not displayed previously, while a previously displayed portion at an opposite side of the display screen moved off the screen so that it is no longer displayed. As another example, an element of a displayed image may be moved relative to the remainder of the displayed image.

Gesture-based scrolling of displayed content, in accordance with embodiments of the present invention, may be advantageous. For example, with a small display screen, such as of a mobile device, only a small portion of an entire image or document may be displayed in a legible manner on the display screen. Viewing the entire document may, then, require repeated scrolling. In the absence of gesture-based control of displayed content, such repeated scrolling would require the user to repeatedly manipulate appropriate controls (e.g., touch screen, pointing device, or key) of the display screen or device. Such repeated manipulation of controls could be tedious or could feel unnatural to a user who is reading a document or viewing an image. Furthermore, repeated manipulation of a control could, in some cases, impair operation of that control (e.g., fingerprint marks on a touch screen).

As used herein, "document" may, in addition to its regular meaning, refer to any document, image, user interface, or other displayable textual or graphic content, and of which a portion may be displayed on a display screen. A document may refer to three-dimensional graphic content, such as a virtual world, a spherical or other solid virtual object, or a 360° panoramic view. A change in the displayed portion of a document is herein referred to as "scrolling." For example, scrolling, as used herein, may include moving a displayed screen object relative to a displayed background. Scrolling, as used herein, may include browsing a user interface so as to sequentially select ordered items. For example, browsing may include selecting for display a next or previous image in an image gallery, or selecting for display a next or previous document page or article in a list.

As used in this document, the term "gesture" may, in addition to its regular meaning, imply a movement of a head, face, eyes or other body part, in a fashion or to an extent that may be recognized through a series of captured images that may be evaluated by a processor, and that may be found to correspond to a pre-defined set of movements, positions or orientations of a body part. In some embodiments a gesture may include a movement or set of movements that may be tracked through one or more captured images. In some embodiments, a gesture may include an assumption of a position or a change in a position and an assumption of a different position of or by such body part. In some embodiments, a gesture need not refer only a continuous movement, but may include an orientation or position that may be assumed and held during a period after a movement. For example, a gesture may include a head or face that is turned in a particular direction, and that is held in the turned position after the movement to that position is completed. Other movements or assumed positions may also be deemed gestures.

In accordance with embodiments of the present invention, a displayed document is scrolled in accordance with a detected gesture, or with assumption of a position or change in a position or orientation by a user who is positioned to view the displayed document. For example, the user's head may be positioned opposite a display screen of a mobile device or other device. A gesture, as used herein, refers to a detected movement, orientation, assumption of a position, or change in a position or orientation of a user's head or body part relative to the display screen, to an imager associated with the display screen, or to an original or other predefined position or orientation. Head movement (to be understood as referring to any movement, e.g., of a face, eyes, facial feature, neck, shoulders, or other movement that is related to head movement) may include rotation, tilting, leaning, lateral movement, or a combination of any of these. The gesture may be detected by analysis of a series of video frames or images (referred to hereinafter as frames) that may be acquired by a camera, video camera, stereo camera or other three-dimensional imager, or other imaging device (e.g., sensitive in the visible or infrared spectral ranges). The imaging device may be located at a known position relative to the display screen. For example, the camera and the display screen may be incorporated into, attachable to, or mountable on a single device (e.g., mobile phone, smartphone, or portable computer).

For example, a head movement or change in a position or orientation may be detected using eye tracking. An orientation of the head may be derived from detected position of each of the eyes (e.g., relative to the frame, to a detected head position, or to one another). Head movement be detected using other techniques, methods, or technologies. For example, head movement may be detected by application of head or face detection or tracking algorithms, such as those that are available in openCV. An object, head, eye, or face tracking system or technology may be utilized, such Microsoft Kinect, Intel® Perceptual Computing Software Development Kit (SDK), or another system or technology.

In some embodiments, head movement may be detected by tracking or identifying changes in position or assumptions or orientations of elements of an imaged user's face relative to one another, or relative to the head or body. For example, a position of the user's head or body and of the user's eyes may be tracked. Head movement may be determined by analyzing a line segment that connects the user's eyes. For example, a length and orientation of the line segment may be indicative of turn or tilt of the user's head. A position of the eyes, or of the line segment connecting the eyes, relative to other features of the user's head, face, or body (e.g., neck or shoulders), or to an outer boundary of the head, face, or body, may also be indicative of an orientation of the user's head.

In accordance with some embodiments of the invention, head movement may be detected by calculation of geometrical changes of facial features (for example, a triangle formed by two eyes, together with the mouth or nose) that are indicative of rotation displacement, changes in an orientation or assumption and retention of certain orientations. In some embodiments, an assumption or an orientation of a body part such as a head, that is outside of an ignore range of movements of the head that is set for detected movements of the body part, may also be considered as a gesture. For example, in some embodiments, a movement of a head of a viewer by, for example, 10° from either side of a center point or start point of a user's head, may be ignored by a processor for purposes of gesture based function activation. Other ranges of movements, including dynamic ignore ranges may be used to determine whether a particular movement or orientation is to be considered a gesture for purposes of gesture based orientation. A duration during which the head is oriented outside of the ignore range may be measured and considered in interpreting a movement as a gesture.

Determination of a rotation of the user's head may include separate tracking of positions of the head and the eyes. Vector algebra may be applied to the tracked positions to determine both a change in position of the head and a change in orientation of the head. For example, the head may be detected as moving through a first displacement (e.g., 5 pixels to the right), and the eyes move by a second displacement (e.g., 10 pixels to the right). The first displacement may then be indicative of lateral displacement of the user's head. The difference between the first displacement and the second displacement (e.g., 5 pixels to the right) may be interpreted as rotation of the user's head (e.g., to the right). An extent of such movements, as measured in for example, pixels or degrees from a center point, or by other metrics, may be tracked and calculated as part of an extent, intensity, or severity of a gesture.

In accordance with embodiments of the present invention, the user may utilize head movement to scroll displayed content. The user's head may be moved in a gesture that is indicative of a desire or need to scroll the displayed content. A head movement may include tilting, rotating or turning, facing one or more directions, moving the head along with the remainder of the body, or another movement or combination of movements. A range of movements or gestures may be pre-defined in a memory of a device, and a detection of a pre-defined movement or a movement falling within the range of movements that is associated with the gesture, may be interpreted as being a gesture. Intensity, direction and duration of the gesture may also be calculated and associated with the gesture In some embodiments, a turn of the user's head may be detected and interpreted to activate a function to cause scrolling of displayed content. For example, the displayed content may be scrolled from the direction toward which the head was turned. Other options of gesture-based scrolling of displayed content are possible. For example, a particular pre-defined head motion may result in another type of scrolling such as up/down scrolling or others.

For example, the user's head may be detected as moving or turning toward one side (e.g., toward the right) of a display screen on which a portion of a document is currently displayed. In this case, the gesture includes facing toward that (e.g., right) side. In response to the detected gesture, the document may be scrolled such that a portion of the document that is adjacent to the currently displayed portion on that (e.g., right) side becomes displayed (e.g., scrolling from right to left). The scrolling causes a portion of the currently displayed portion on the opposite (e.g., left) side to be removed from view. (The head motion may be in a diagonal direction. For example, if the user's head is detected as turning toward upper left, the displayed content may scroll from upper left toward bottom right.) Other pre-defined ranges of movements and the functions that are associated with such movements are possible.

Thus, gesture-based scrolling of displayed content, such as a displayed document, may mimic viewing of a physical (hardcopy) document. As in viewing a physical document, turning or moving one's head toward one side of the document brings that side of the document into view. Thus, gesture-based scrolling of displayed content, in accordance with embodiments of the present invention, may be perceived as natural or instinctive by a user who is viewing the displayed content.

In some cases, scrolling based on eye movement alone, without head movement, may not be perceived as natural. This may be because eyes tend to jump about when viewing a scene, and are moved slightly to view different sections of a viewed scene. For example, when scrolling, the eyes may tend to scan the document to see whether a desired section of the document has come into view. Thus, in some cases, gestures based on eye movement alone may result in erratic scrolling that may be perceived as distracting. On the other hand, scrolling based on head movement may be perceived as natural to a user. There is often a natural tendency to turn or tilt one's head when the eyes are turned past a limit, e.g., of comfortable viewing. When a viewed object is brought within a comfortable viewing angular range, one naturally turns one's head to a comfortable position, e.g., approximately straight ahead or at another comfortable angle.

Gestures may be interpreted using one of several modes so as to control scrolling. For example, the mode utilized may be determined automatically by an application that utilizes gesture-based scrolling of displayed content. The mode may be selected as appropriate to that application, or to a context within an application. As another example, the mode of translating a detected gesture to scrolling of displayed content may be user-selectable. An application utilizes gesture-based scrolling of displayed content may enable a user to select a mode (e.g., via a user interface or control) a mode of translating a detected gesture to scrolling of displayed content. In some embodiments, a user may define his own gestures by demonstrating the gesture in front of an imager, and associating the defined gesture with a function of the device that the user may select. A processor may record coordinates or parameters such as degrees from a starting position or speed of movement of the defined or demonstrated gesture, and such recorded or pre-defined gestures may be stored in a memory and associated with a particular scrolling function. (The association may be approximate since an exact movement is unlikely to be repeated by the user at a later time.)

For example, gesture-based scrolling of displayed content may be implemented in a manner in which a gesture controls scrolling in a manner similar to operation of a joystick. When operating in such a joystick mode, a command to scroll is triggered by the user's head being detected as moving beyond a threshold or limit (e.g., angular, positional, or a combination of both), such as beyond an ignore range of movements of the head which are not to be associated with a gesture. One or more of the extent of the head movement, or a rate (e.g., angular or linear velocity) of the head movement, the direction of the movement, and the duration of the position of the head remaining in the particular orientation may be measured. The speed of scrolling of a displayed document may be determined by the measured extent (or rate) of the head movement. Thus, the gesture may determine one or more of the direction, rate, and duration of scrolling. The scrolling may then continue at the determined or some other speed in the determined direction as long as the head is not moved further or moved back within, or toward, an ignore range. (A scrolling rate or other parameter may change, e.g., decrease, when the head is detected as moving toward the ignore range.) Another movement of the head may then change the rate or direction of the scrolling. When a portion of the document that the user wishes to view is displayed as a result of the scrolling, the user's head may be moved to within the ignore range, e.g., facing a central part of the display screen (since looking at the center of the screen when desired content is displayed, is often a natural and instinctive response), whereupon the scroll may terminate.

With a joystick mode, a head movement to a point that is outside an ignore range of an initial or starting point or position of the head (e.g., facing a center of the display screen or an initially determined gaze direction or face orientation) may initiate and maintain scrolling. A movement of a head from a prior orientation or position of the head (e.g., as characterized by a vector displacement of a tracked element of the head or of a direction faced by the head) may determine a scrolling rate. For example, the scrolling rate may be proportional to the magnitude of the head movement, or may be determined by another relationship. A head movement toward the initial point may decrease the scrolling rate. A head movement to within the ignore range may cause scrolling to stop. Keeping a position of the head outside of the ignore range, may cause the scroll to continue for the duration that such position is held and at a scroll rate that is indicated by the position. This may be analogized to the function of a joy-stick where the intensity, direction and duration of pressing on the stick may determine the intensity (such as the speed of a scroll), direction and duration of the desired function.

Gesture-based scrolling of displayed content in a joystick mode may include a capability to trigger rapid scrolling for a short duration. (The trigger gesture may be analogous to a "throw gesture" that is enabled on some devices with touch screens.) The trigger gesture may include a rapid head movement in a direction opposite the desired rapid scroll. A head movement may be interpreted or pre-defined as a trigger gesture when a rate of the head movement exceeds a threshold rate. For example, in response to a detected trigger gesture, the screen may rapidly scroll a predetermined distance, after which the scrolling slows and stops. A rapid movement in a direction opposite the trigger gesture may be utilized to stop the rapid scrolling prior to scrolling the predetermined distance.

An alternative to the joy-stick mode may be a pointer mode, which may be configured such that an extent (e.g., distance) of the scrolling is determined by a change in head position resulting from the head motion. For example, gesture-based scrolling of displayed content may be implemented so that a gesture controls scrolling similar to operation of a pointer. When operating in pointer mode, a displayed screen object, such as a cursor or other graphic object is displayed on the display screen in a position that is determined by a detected movement of the user's head into a certain position. For example, when the user's head is moved to face a point on the display screen (e.g., as determined from a calculated direction of gaze, or by a rotation or orientation of a head from a defined position or toward a given position), the screen cursor or graphic object is moved to an indicated point. A cursor or other object may be moved against a stationary background image. An entire image (e.g., a map or document) may be scrolled or shifted to be centered at the point indicated by the head movement. In pointer mode, an orientation of a face or head may be reflected by moving an object on the display screen to the area or coordinate of the screen that is pointed to by the face or head.

A pointer mode may enable accurate control on the screen of the object regardless of the size of the display screen. For example, a head movement range (e.g., as defined by a range of angles or directions, such as for example a 30 degree range of movement from a center point of a gaze of a viewer) may be defined. The range may be based on predetermined criteria (e.g., as determined by a detected distance of the user's head from the display screen), or may be based on user actions during a setup, initialization, or calibration procedure. The head movement range may indicate a total range of comfortable head movements. When the display screen is small or far away from the user, the head movement range may be larger than the range of directions subtended by the display screen. Thus, a user's head motion may be defined as relative to (e.g., as a fraction of) the defined full head movement range. In response to a detected head movement, the position of a screen object may be displaced by a proportional or otherwise corresponding (in size and direction) displacement on the display screen. For example, a head movement to the right by 20% of the defined full head movement range may cause a screen object to be moved to the right side of the display screen by a distance that is 20% of the width of the section or the field of the display screen in which display of the screen object is enabled. For some people, a comfortable full head movement range may be assumed to be about 45 degrees about a center or straight-ahead position, such as 22.5 degrees in each direction from a center point.

For example, a game application or other application may involve moving a screen object (e.g., simulated vehicle or person) against a background (e.g., road, map, simulated surface, three-dimensional virtual world, or panoramic view). When gesture-based scrolling of displayed content is implemented in joystick mode, motion of the user's head may determine a speed and direction of movement of the screen object against the background. For example, the screen object may continue to be displayed at a substantially constant position within the display screen, while movement of the object is simulated by scrolling of the background in an opposite direction. On the other hand, when gesture-based scrolling of displayed content is implemented in pointer mode, motion of the user's head may determine placement of the screen object against the background. For example, the background may remain substantially stationary, while the position of the screen object on the display screen is changed in response to movement of the user's head.

In the pointer method, an orientation or direction of a viewer's face, eyes, head or other body part may indicate an element on a display that is to be, for example, highlighted or subject to some other function. For example, an application may present a user with a tool bar or first drop-down screen as part of a list of functions that may be executed on a particular screen or program. A system may track an orientation of the user's head or other body part as it points to an element on the drop down screen, graphic element or tool bar. The system may track the user's head as it moves across, for example to the right, from the element, and may present the viewer with another or second drop-down screen that may show the functions available for execution in respect of first selected element. A user may look or point to an element in this second drop-down screen as a way of selecting the element. An execution of the function represented by the selected element may be done by, for example, a pre-defined gesture, a squeeze, shake on the device, a sound, or some other input. Such scrolling of elements using the pointer method applied to a detected orientation or position of a head may allow operation of a device with reduced number of touches or taps of the device.

A single application may implement gesture-based scrolling of displayed content in joystick mode and in pointer mode at different times or phases of the application. Selection of the mode may be voluntarily controlled by the user (e.g., by head movements or gestures, or by operation of another control), or may be automatically selected in accordance with a set of one or more criteria.

Gesture-based scrolling of displayed content, in accordance with some embodiments of the present invention, may include an initialization or calibration process. The calibration process may be performed automatically, or may require user involvement. For example, a calibration process may define positions of one or more elements of the user's face or head, or an angle of the head (e.g., to define an appropriate reference point or framework) when facing the display screen (e.g., one or more displayed points or objects), or one or more other definable points.

Once a first position of the user's head is determined, e.g., from an initial calibration or from analysis of a subsequently acquired image, subsequent movement of the user's head may be calculated as relative to the first position. Updated images of the user's head may be acquired for analysis at a suitable rate (for example, every 1/20 second), though images may be acquired more often with only some of the acquired images being analyzed. Positions of one or more elements of the user's face or head may be determined from analysis of each subsequently acquired image to yield a new head position. Head movement may be calculated by comparison of the new head position with the first position. If the new position is within an ignore range of the first position, the head movement may be ignored. For example, no scrolling of displayed content is performed. However, when the new head position is outside of the ignore range of the first position, the head movement may be interpreted as a pre-defined gesture. As a result of the detected gesture, the display content may be scrolled.

FIG. 10A schematically illustrates a head position for gesture-based scrolling of displayed content, in accordance with an embodiment of the present invention.

User head 340 is looking at display screen 314 of device 310. The current position of user head 340 is defined by head position vector 342 (e.g., representing a head direction or some other direction that characterizes a current position of user head 340). For example, head position vector 342 may be determined by an image of user head 340 that is acquired by an imaging device of device 310.

FIG. 10B schematically illustrates a change in head position for gesture-based scrolling of displayed content, in accordance with an embodiment of the present invention.

As shown, a first position of user head 340 is defined by first user head position vector 342a. After user head 340 is moved, a new position of user head 340 is defined by new user head position vector 342b. Displacement vector 344, equal to the vector difference between new user head position vector 342b and first user head position vector 342a, defines a movement of user head 340. Displacement vector 344 may alternatively be understood as representing an angular displacement between angular coordinates (e.g., spherical coordinates) representing two orientations of user head 340.

If displacement vector 344 falls within ignore range 346, the motion defined by displacement vector 344 may not be interpreted as a gesture. For example, ignore range 346 may be defined relative to (e.g., symmetrically surrounding) first user head position vector 342a. If displacement vector 344 extends beyond ignore range 346, the motion defined by displacement vector 44 may be interpreted as a gesture.

Displayed content on display screen 314 may be scrolled in a manner indicated by a gesture. For example, a scrolling rate may be related to a magnitude of displacement vector 344. A direction of scrolling may be in a direction that is opposite the direction of displacement vector 344. Thus, a portion of a viewed document beyond an end of the document indicated by the direction of displacement vector 344 becomes visible.

In accordance with some embodiments of the present invention, head movement may be determined by tracking one or more elements of an image of the user's head.

FIG. 11A schematically illustrates a position of an element in a head image for gesture-based scrolling of displayed content, in accordance with an embodiment of the present invention.

First frame 350a includes first head image 354a. First element position 352a (e.g., an eye image) of first head image 354a is determined.

FIG. 11B schematically illustrates movement of an element of head image for gesture-based scrolling of displayed content, in accordance with an embodiment of the present invention.

In new frame 350b, new head image 354b is moved with respect to first head image 354a. In new head image 354b, new element position 352b is displaced by displacement vector 356 with respect to first element position 352a. Displacement vector 356 may be interpreted as a gesture.

For example, a scrolling rate may be related to a magnitude of displacement vector 356. A direction of scrolling may be in a direction that is opposite the direction of displacement vector 356. Thus, a portion of a viewed document beyond an end of the document indicated by the direction of displacement vector 356 becomes visible.

In accordance with some embodiments of the present invention, a relation between a gesture and the resulting scrolling direction may be constrained. For example, scrolling may be limited to along one axis of a displayed image, regardless of the direction of a gesture or head movement. In such a case, a scrolling rate or direction may be determined only by that component of a displacement vector that is parallel (or at some other predetermined orientation to) the scrolling axis. For example, if the user's head is turned toward a corner of the display, while scrolling is limited to the vertical direction, then only a magnitude and direction of a vertical component of the displacement vector may be utilized in determining the a scrolling rate or direction. In this example, the horizontal component of the displacement vector may be ignored. As a further example, if a scrolling is limited to the vertical direction and the displacement vector has a large horizontal component (e.g., defined as the magnitude of the horizontal component exceeding a maximum fraction of the magnitude of the displacement vector), the detected movement may be ignored.

FIG. 12 is a flowchart depicting a method for gesture-based scrolling of displayed content, in accordance with an embodiment of the present invention.

Gesture-based scrolling method 3200 may be executed by a processor that is incorporated into, or that is associated with, a device that includes a display screen that is configured to display scrollable content.

A movement of a head of user of the device is detected (block 3210). For example, a head movement may be detected by tracking of one or more facial features of the user, or other parts of the user's body. The head or feature may be tracked by acquisition of a series of images of the user's head, e.g., by a video camera of the device. The head movement may be characterized by a (linear or angular) displacement vector, a velocity vector, or both.

A detected head movement may be identified or be associated with a pre-defined gesture (block 3220). For example, the detected head movement may include turning or other movement of the head beyond (e.g., characterized by displacement vector with magnitude greater than) an ignore range. The detected head movement may include turning in a single direction, or in another manner that may be pre-identified and associated with a gesture. The detected head movement that may be identified as a gesture may include turning to face a direction that is outside of an ignore range of a previously determined direction. If the detected monitoring is not identified as a gesture, head movement detection continues (return to block 3210).

If the detected head movement is identified as a gesture, content that is displayed on a display screen is scrolled (block 3230). A scrolling rate or distance may be determined in accordance with one or more characteristics of the head movement (e.g., a magnitude or direction of the head movement). In some cases (e.g., joystick mode), scrolling may continue until detection of another movement. In some cases (e.g., pointer mode), scrolling may include moving a displayed screen object (e.g., cursor, icon, graphic figure, or entire image) to a point that is determined by a direction that is faced by the head after the movement (e.g., either directly toward the point faced or otherwise determined, e.g., proportional to a fraction of a head movement range).

Head movement detection continues (return to block 3210).

Reference is made to FIG. 13, a flowchart of a method for activating a function for scrolling content on an electronic display, in accordance with an embodiment of the invention. In block 3300, there may be detected in a series of images captured by an imager that is associated with an electronic display, a pre-defined movement of a body part of a viewer. The pre-defined movement may be recognized as fitting a pattern of pre-defined movements that may be stored in a memory, where the detected movement is associated with activation of the scroll function. In block 3302, upon such detection of the pre-defined movement a scroll function may be activated, and content on the display may be scrolled. In some embodiments, detecting said movement of a body part may include detecting a direction of a movement of a head of a user or viewer, and activating the scroll function may include, scrolling displayed content in a direction opposite to the detected movement.

In some embodiments, the detecting of the pre-defined movement includes detecting a movement of a head past a pre-defined ignore range of movement, and activating the scroll function may be continued until the head returns to an area within the ignore range.

The invention claimed is:
1. A method for scrolling displayed content, the method comprising:
    detecting, in a series of acquired images of a user of a device on which the content is displayed, a movement of a head of the user;
    determining that the detected movement corresponds to a gesture when it exceeds an ignore range of at least one of angular and positional movements;
    when the movement corresponds to a gesture, scrolling the displayed content as indicated by the gesture; and when the movement returns to the ignore range, adjusting the scrolling by at least one of stopping and changing scrolling rate, wherein gestures that mimic natural head movements correspond to scrolling that mimics viewing of a physical object.

2. The method of claim 1, wherein a direction of the scrolling is opposite a direction of the detected head movement.

3. The method of claim 1, wherein a rate of the scrolling is determined by a magnitude of a vector that characterizes the detected head movement.

4. The method of claim 1, wherein the scrolling continues until detection of another head movement.

5. The method of claim 1, wherein an extent of the scrolling is determined by an extent of a change of an orientation of the head in the detected head movement.

6. The method of claim 5, wherein an extent of the scrolling is proportional to said change in orientation.

7. The method of claim 6, wherein said extent of a change in orientation is determined as a fraction of a head movement range.

8. The method of claim 5, wherein the scrolling comprises moving a screen object to a position that is determined by the change in the orientation.

9. The method of claim 1, wherein detecting the head comprises, in an acquired image of said series of acquired images, estimating an expected size and expected location of an image of an iris of an eye within that acquired image, and determining a location of the iris image within that acquired image by identifying a region within the expected location, a size of the region being consistent with the expected size, wherein pixels of the region have luminance values darker than pixels of other regions within the expected location.

10. The method of claim 1, wherein detection of movements is carried out with determination of head movement only.

11. The method of claim 1, wherein scrolling the displayed content comprises at least one of scrolling, panning and zooming.

12. A device comprising:
a display screen configurable to display a content;
an imaging device configurable to acquire a series of images of a head of a user of the device;
a processor configured to:
detect in the series of acquired images, a movement of the user's head; and
determine that the detected movement corresponds to a gesture when it exceeds an ignore range of at least one of angular and positional movements;
scroll the displayed content when the detected movement corresponds to a gesture in a manner indicated by the detected movement; and
when the detected movement returns to the ignore range, adjust the scrolling by at least one of stopping and changing scrolling rate,
wherein gestures that mimic natural head movements correspond to scrolling that mimics viewing of a physical object.

13. The device of claim 12, comprising a mobile device.

14. The device of claim 12, wherein the imaging device comprises a video camera.

15. The device of claim 12, wherein the processor is configured to scroll the displayed content at a rate of that is indicated by the detected movement.

16. The device of claim 12, wherein the processor is configured to scroll the displayed content in a direction that is opposite to the detected movement.

17. The device of claim 12, wherein the processor is configured to continue to scroll the displayed content until another head movement is detected.

18. A method of activating a scroll function on an electronic display, the method comprising:
detecting, in a series of images captured by an imager, said imager associated with the display, a movement of a head of a viewer to a pre-defined orientation, said movement associated with activation of said scroll function;
determining that the detected movement exceeds an ignore range of at least one of angular and positional movements;
activating said scroll function for the duration of a period that the head retains said orientation; and
when the detected movement returns to the ignore range, adjusting the scrolling to at least one of stopping and scrolling rate change,
wherein gestures that mimic natural head movements correspond to scrolling that mimics viewing of a physical object.

19. The method as in claim 18, wherein said detecting said movement of a body part comprises detecting a direction of a movement of a head of said user, and wherein said activating said scroll function comprises, scrolling content displayed on said display in a direction opposite of said detected movement.

20. The method as in claim 18, wherein an intensity of said scrolling is a function of an intensity of said movement.

* * * * *